(12) United States Patent
Restorp et al.

(10) Patent No.: US 11,912,904 B2
(45) Date of Patent: Feb. 27, 2024

(54) ADHESIVE COMPOSITIONS

(71) Applicant: NOURYON CHEMICALS INTERNATIONAL B.V., Arnhem (NL)

(72) Inventors: Per Anders Restorp, Sävedalen (SE); Hans Lagnemo, Gothenburg (SE); Peter Harry Johan Greenwood, Gothenburg (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 442 days.

(21) Appl. No.: 17/250,261

(22) PCT Filed: Jun. 13, 2019

(86) PCT No.: PCT/EP2019/065487
§ 371 (c)(1),
(2) Date: Dec. 22, 2020

(87) PCT Pub. No.: WO2020/001989
PCT Pub. Date: Jan. 2, 2020

(65) Prior Publication Data
US 2021/0139753 A1    May 13, 2021

(30) Foreign Application Priority Data
Jun. 28, 2018  (EP) .................... 18180439

(51) Int. Cl.
*C08K 3/36* (2006.01)
*C09J 133/06* (2006.01)
*C08K 9/02* (2006.01)
*C08K 9/06* (2006.01)

(52) U.S. Cl.
CPC ............. *C09J 133/06* (2013.01); *C08K 3/36* (2013.01); *C08K 9/02* (2013.01); *C08K 9/06* (2013.01)

(58) Field of Classification Search
CPC ......... C09J 133/06; C09J 131/04; C08K 3/36; C08K 9/02; C08K 9/06
USPC ...................................................... 523/209
See application file for complete search history.

(56) References Cited

U.S. PATENT DOCUMENTS

| | | | |
|---|---|---|---|
| 2,630,410 A | 3/1953 | Clapsadle et al. | |
| 3,620,978 A | 11/1971 | Moore, Jr. | |
| 3,719,607 A | 3/1973 | Moore, Jr. | |
| 3,745,126 A | 7/1973 | Moore, Jr. | |
| 3,769,248 A | 10/1973 | Kovats | |
| 3,864,142 A | 2/1975 | Kovarik | |
| 3,956,171 A | 5/1976 | Moore, Jr. et al. | |
| 4,145,338 A | 3/1979 | Matsubara et al. | |
| 4,927,749 A | 5/1990 | Dorn | |
| 5,368,833 A | 11/1994 | Johansson et al. | |
| 6,538,057 B1 | 3/2003 | Wildburg et al. | |
| 8,071,670 B2 | 12/2011 | Pantke et al. | |
| 8,461,247 B2 | 6/2013 | Willimann et al. | |
| 8,465,581 B2 | 6/2013 | Wescott et al. | |
| 8,765,889 B2 | 7/2014 | Siol et al. | |
| 2004/0077768 A1* | 4/2004 | Greenwood | C09D 5/028 524/492 |
| 2007/0292683 A1 | 12/2007 | Pantke et al. | |
| 2009/0111929 A1* | 4/2009 | Beyers | C09J 133/066 524/556 |
| 2013/0046050 A1* | 2/2013 | Siol | C08F 2/44 977/773 |
| 2013/0131220 A1* | 5/2013 | Zapf | C04B 24/2652 524/533 |
| 2013/0245155 A1 | 9/2013 | Van Loon et al. | |

FOREIGN PATENT DOCUMENTS

| | | |
|---|---|---|
| CN | 102286233 A | 12/2011 |
| CN | 10580254 A | 7/2016 |
| CN | 106749801 A | 5/2017 |
| CN | 107345121 A | 11/2017 |
| EP | 1854857 A1 | 11/2007 |
| IN | 4396/CHE/2011 | 6/2013 |
| IN | 107245249 A | 10/2017 |
| JP | H07324103 A | 12/1995 |

(Continued)

OTHER PUBLICATIONS

EPO, Extended Search Report issued in EP Application No. 18180439, dated Sep. 21, 2018.
EPO, International Search Report issued in Int'l Application No. PCT/EP2019/065487, dated Jun. 26, 2019.
AkzoNobel, "Levasil Colloidal Silica". Retrieved from Internet URL: https://colloidalsilica.akzonobel.com/applications/adhesives/. Retrieved on Jan. 23, 2018.
Database WPI. Week 201373, Thomas Scientific, London, GB. An 2013-S563. XP-002784984 and IN2011CH04396A1.

(Continued)

*Primary Examiner* — Hannah J Pak
(74) *Attorney, Agent, or Firm* — LORENZ & KOPF, LLP

(57) ABSTRACT

The disclosure is directed to a method for preparing an adhesive composition, in which an aqueous phase comprising a modified colloidal silica is mixed with an organic phase comprising one or more monomers in the presence of an initiator, wherein conditions are maintained such that polymerisation of the one or more monomers occurs to form an aqueous polymeric dispersion, wherein;

(i) the aqueous polymeric dispersion comprises polymer particles with protective colloid on their surface;

(ii) the modified colloidal silica comprises colloidal silica particles with at least one surface-bound hydrophilic organosilane moiety and/or comprises colloidal silica particles with at least one additional element on its surface, the element being able formally to adopt a +3 or +4 oxidation state; and (iii) the initiator is at least partially soluble in water.

19 Claims, 5 Drawing Sheets

(56) References Cited

FOREIGN PATENT DOCUMENTS

| | | |
|---|---|---|
| JP | H08143822 | 6/1996 |
| JP | 2000191876 A | 7/2000 |
| JP | 2004161910 A | 6/2004 |
| WO | 2004035473 A1 | 4/2004 |
| WO | 2004035474 A1 | 4/2004 |
| WO | 2005097678 A1 | 10/2005 |
| WO | 2011098412 A1 | 8/2011 |
| WO | 201405753 A1 | 1/2014 |
| WO | 2014005753 A1 | 1/2014 |

OTHER PUBLICATIONS

Bonnefond, A. et al., "Effect of the Incorporation of Modified Silicas on the Final Properties of Wood Adhesives", Macromolecular Reaction Engineering, 2013, pp. 527-537, vol. 7, No. 10.

Greenwood, P., "Aqueous silane modified silica sols: theory and preparation", Pigment and Resin Technology, Sep. 2011, vol. 40, No. 5, pp. 275-284.

Sears, G.W. Jr., "Determination of specific surface area of colloidal silica by titration with sodium hydroxide", Analytical Chemistry, 1956, pp. 1981-1983, vol. 28, No. 12.

Iler, R.K., et al. "Degree of hydration of particles of colloidal silica in aqueous solution", Journal of Physical Chemistry, 1956, pp. 955-957, vol. 60, No. 7.

Iler, R.K., "The Chemistry of Silica. Solubility, Polymerization, Colloid and Surface Properties, and Biochemistry", 1979, Chapter 5, p. 465, John Wiley and Sons.

Iler, R.K., "The Chemistry of Silica. Solubility, Polymerization, Colloid and Surface Properties, and Biochemistry", 1979, Chapter 4, p. 407-409, John Wiley and Sons.

Ullmann's Encyclopedia of Industrial Chemistry, VCH, Weinheim, vol. 19, 4th Ed., Publishing House Chemistry, Weinheim, 1980, pp. 17-18.

Ullmann's Encyclopedia of Industrial Chemistry, VCH, Weinheim, vol. A21, Publishing House Chemistry, Weinheim, 1992, p. 169.

Fox, T.G., Bull. Am. Phy. Soc. (Ser II) 1, 123 (1956).

\* cited by examiner

ADHESIVE COMPOSITIONS

CROSS-REFERENCE TO RELATED APPLICATION

This application is a U.S. National-Stage entry under 35 U.S.C. § 371 based on International Application No. PCT/EP2019/065487, filed Jun. 13, 2019, which was published under PCT Article 21(2) and which claims priority to European Application No. 18180439.4, filed Jun. 28, 2018, which are all hereby incorporated in their entirety by reference.

TECHNICAL FIELD

The present disclosure relates to adhesive compositions, in particular aqueous adhesive compositions, comprising dispersed polymer. The disclosure also relates to a method of producing the adhesive compositions.

BACKGROUND

Adhesive compositions are often based on latexes, i.e. aqueous emulsions or dispersions of polymeric particles. Examples include those based on polyvinyl acetates, polyacrylates and styrene-butadiene rubbers, including their copolymers. However, although widely used, there are still improvements that can be achieved. For example, it is important for the dried adhesive to be strong, to be stable with time, and to be resistant to water. It is also important, when making any modifications to the formulation to improve adhesive properties, to ensure the storage stability and shelf-life are unaffected.

Nanocomposite particles are one type of additive that has been used in an attempt to improve properties of latex adhesives. For example, organic-inorganic hybrid nanocomposite materials have been reported, in which inorganic additives such as silica are added to a polyvinyl acetate latex to modify its properties. Bonnefond et al.; Macromol. React. Eng. 2013, 7, 527-537 describes the use of silica and silicone- or vinyl-modified silica in polyvinylalcohol-stabilised polyvinylacetate. IN4396/CHE/2011 describes the use of nano-colloidal silica in a polyvinylalcohol-stabilised polyvinylacetate adhesive formulation. WO2014/005753 describes the use of inorganic nanoparticles and organic polymers in a variety of compositions, including adhesives. US 2007/0292683 relates to aqueous polymeric dispersions comprising polyvinylacetate and silica particles with an average diameter of about 1 to 400 nm, and their use as adhesives and coatings.

These documents all refer to different methods of synthesising the nanocomposite materials, for example in some cases the inorganic material is added before the latex is formed, i.e. before polymerisation of the monomer to form the emulsified polymer particles. In some methods, the inorganic material can be added to the organic monomer-containing phase (e.g. Bonnefond et al. and WO2014/005753) before polymerisation commences, while in other methods, (e.g. IN4396/CHE/2011) it is added to the aqueous phase. In further methods (e.g. US2007/0292683), the inorganic material is merely added to or blended with the post-synthesized latex.

There remains a need for improved adhesive compositions and methods for their preparation.

In the discussion below, polyvinylacetate is sometimes referred to as PVAc, and polyvinylalcohol is sometimes referred to as PVOH. In addition, other objects, desirable features and characteristics will become apparent from the subsequent summary and detailed description, and the appended claims, taken in conjunction with the accompanying drawings and this background.

BRIEF SUMMARY

This disclosure provides a method for preparing an adhesive composition, in which an aqueous phase comprising a modified colloidal silica is contacted with an organic phase comprising one or more monomers in the presence of an initiator, wherein conditions are maintained such that polymerisation of the one or more monomers occurs to form a polymeric dispersion, wherein;
  (i) the polymeric dispersion comprises polymer particles with protective colloid on their surface;
  (ii) the modified colloidal silica comprises colloidal silica particles with at least one surface-bound hydrophilic organosilane moiety and/or comprises colloidal silica particles with at least one additional element on their surface, the element being able formally to adopt a +3 or +4 oxidation state; and
  (iii) the initiator is at least partially soluble in water.

This disclosure also provides an adhesive composition comprising an aqueous polymeric dispersion and modified colloidal silica particles, in which;
  (i) the polymeric dispersion comprises polymer particles with protective colloid on their surface, the polymer particles being formed from polymerisation of one or more monomers;
  (ii) the modified colloidal silica comprises colloidal silica particles with at least one surface-bound hydrophilic organosilane moiety and/or comprises colloidal silica particles with at least one additional element on their surface, the element being able formally to adopt a +3 or +4 oxidation state; and
  (iii) at least a portion of the colloidal silica particles chemically interact with the protective colloid.

BRIEF DESCRIPTION OF DRAWINGS

The present disclosure will hereinafter be described in conjunction with the following drawing figures, wherein like numerals denote like elements, and.

DETAILED DESCRIPTION

Figure 1:
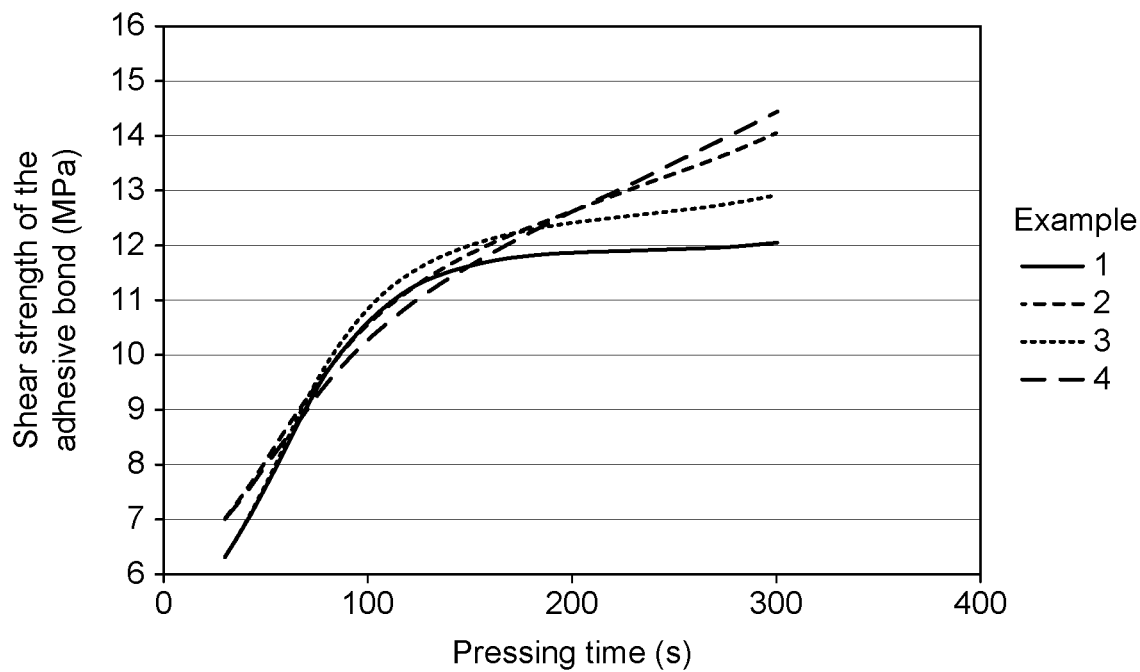
FIG. 1 is a plot of shear strength versus pressing time for dried adhesive compositions, where the surfaces were pressed together at a temperature of 80° C.

The following detailed description is merely exemplary in nature and is not intended to limit the disclosure or the application and uses of the disclosure. Furthermore, there is no intention to be bound by any theory presented in the preceding background of the disclosure or the following detailed description.

The disclosure is directed to a method for preparing an adhesive composition, in which an aqueous phase comprising a modified colloidal silica is mixed with an organic phase comprising one or more monomers in the presence of an initiator, wherein conditions are maintained such that polymerisation of the one or more monomers occurs to form an aqueous polymeric dispersion, wherein;
  (i) the aqueous polymeric dispersion comprises polymer particles with protective colloid on their surface;
  (ii) the modified colloidal silica comprises colloidal silica particles with at least one surface-bound hydrophilic organosilane moiety and/or comprises colloidal silica particles with at least one additional element on its surface, the element being able formally to adopt a +3 or +4 oxidation state; and
  (iii) the initiator is at least partially soluble in water.

The disclosure is also directed to an adhesive composition comprising an aqueous polymeric dispersion and modified colloidal silica particles, in which;
  (i) the aqueous polymeric dispersion comprises polymer particles with protective colloid on their surface;
  (ii) the modified colloidal silica comprises colloidal silica particles with at least one surface-bound hydrophilic organosilane moiety and/or comprises colloidal silica particles with at least one additional element on its surface, the element being able formally to adopt a +3 or +4 oxidation state; and
  (iii) at least a portion of the colloidal silica particles chemically interact with the protective colloid.

Such an adhesive composition can be prepared by the method described above.

The disclosure relates to latex-based (aqueous polymer dispersion-based) adhesive compositions, and a method for their production which enables the resulting product to have improved properties.

The method involves polymerisation of a monomer or mixture of monomers under conditions such that an aqueous polymer dispersion (or latex) results. The polymer dispersion is stabilised with a protective colloid.

In embodiments, the reaction mixture can initially comprise an emulsion of a monomer-containing organic phase in an aqueous continuous phase. The monomer is then polymerised in the presence of initiator, which forms a dispersion of polymer in a continuous aqueous phase. The aqueous phase comprises the water-miscible components, such as initiator, colloidal silica, and protective colloid stabiliser. Although organic solvents can be present in this aqueous phase (for example C1-4 alcohols, ketones, carboxylic acids or glycols), they are maintained at concentrations below that which would disrupt the formation of an emulsion or dispersion of the organic phase. Therefore, if present, they comprise no more than 10 wt % of the aqueous phase, and typically no more than 5 wt %.

Monomers

In the disclosure, the monomer, or at least one monomer is preferably an alkenyl carboxylate ester-based monomer, an acrylate-based monomer, an acrylonitrile-based monomer or a styrene-based monomer. Where a mixture of monomers is used, there can also be one or more further alkenyl carboxylate ester-, acrylate-, acrylonitrile- or styrene-based monomer, and/or one or more diene monomers. Where a styrene-based monomer is used, a diene co-monomer is also typically used.

Typically, the monomer, or at least one monomer, is an alkenyl carboxylate ester-based monomer.

In embodiments, the monomers that are suitable for use can have a chemical formula according to Formula 1:

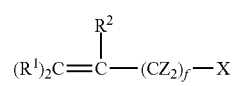

Formula 1

$R^1$ and $R^2$ on each occurrence are independently selected from H, halide and $C_{1-20}$ alkyl. Each $C_{1-20}$ alkyl can optionally be substituted with one or more groups selected from hydroxyl, halide, oxygen (i.e. to form a C=O moiety), —$OR^3$ and —$N(R^3)_2$. In embodiments, $R^1$ and $R^2$ cannot both be halide. In embodiments, the $C_{1-20}$ alkyl is a $C_{1-6}$ alkyl such as a $C_{1-4}$ alkyl or a $C_{1-2}$ alkyl. Typically, at least one $R^1$ or $R^2$ group is H.

$R^3$ on each occurrence is independently selected from H and optionally substituted $C_{1-6}$ alkyl, where the optional substituents are hydroxyl, halide, amino, $C_{1-6}$ alkoxy, $C_{1-6}$ alkyl-amino and $C_{1-6}$ dialkyl amino Each $C_{1-6}$ group can, in embodiments, be a $C_{1-4}$ group or a $C_{1-2}$ group.

In the group —$[CZ_2]_f$—, each Z is independently selected from H, halide, $C_{1-3}$ alkyl and $C_{1-3}$ haloalkyl; and f is a whole number in the range of from about 0 to 4, for example from about 0 to 2 or from about 0 to 1. In embodiments, the $C_{1-3}$ alkyl can be methyl and the $C_{1-3}$ haloalkyl can be halomethyl. In embodiments, there are no halides or haloalkyl substituents. In embodiments, f is 0, i.e. there is a direct bond between the C—$R^2$ group and the X group.

X is selected from:

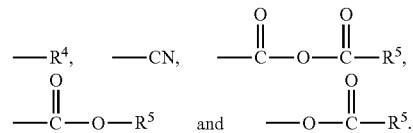

$R^4$ on each occurrence is independently selected from $C_{5-8}$ aryl and $C_{5-8}$ heteroaryl groups. The aryl or heteroaryl groups can optionally be substituted with one or more groups selected from hydroxyl, halide, —$N(R^3)_2$, nitrile, $C_{1-10}$ alkyl, $C_{1-10}$ haloalkyl, $C_{1-10}$ alkoxy and $C_{1-10}$ haloalkoxy. The heteroaryl group comprises one or more heteroatoms in the ring, each independently selected from O, S and N. In embodiments, the aryl or heteroaryl group is a $C_6$ group. In embodiments, the heteroatom is N. In embodiments, the aryl group is an optionally substituted benzene ring. In embodiments, the aryl or heteroaryl group contains no halide or halide-containing substituents. In embodiments, the aryl group is unsubstituted.

When X is $R^4$ there is typically also an additional monomer in the organic phase, for example a diene-based monomer.

$R^5$ on each occurrence is independently selected from H, optionally substituted $C_{1-20}$ alkyl and optionally substituted $C_{1-20}$ alkenyl. Each $C_{1-20}$ alkyl or $C_{1-20}$ alkenyl group can optionally be substituted with one or more groups selected from hydroxyl, halide and $-N(R^3)_2$. In embodiments, the $C_{1-20}$ alkyl or alkenyl group can be a $C_{1-6}$ alkyl or alkenyl group, for example a $C_{1-4}$ alkyl or alkenyl group.

In embodiments, X is selected from

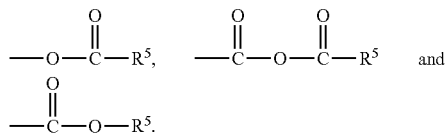

In embodiments, in such monomers, f in $[CZ_2]_f$ is 0. In embodiments $R^5$ is selected from H and optionally substituted $C_{1-6}$ alkyl, and in further embodiments the $C_{1-6}$ alkyl is unsubstituted.

In embodiments, Formula 1 is halide-free, i.e. there are no substituents or optional substituents containing a halide moiety.

In embodiments, the monomer, or at least one monomer, has a formula where X is

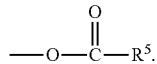

In Formula 1 above, or any of the Formulae defined below, any alkyl or alkenyl groups (whether substituted or unsubstituted) can be linear, branched or cyclic. Any halide moiety independently and on each occurrence can be selected from F, Cl, Br and I, typically F and Cl.

Alkenyl Carboxylates

In embodiments, at least one monomer is an alkenyl carboxylate ester-based monomer. Such monomers can, in embodiments, comprise from 4 to 20 carbon atoms. Specific examples include vinyl formate, vinyl acetate, vinyl propionate, vinyl butyrate, vinyl pivalate, vinyl versatate (where the versatate group comprises a $C_{4-12}$ branched alkyl group), vinyl stearate, vinyl laurate, vinyl-2-ethyl hexanoate, 1-methyl vinyl acetate, as well as vinyl esters of benzoic acid and p-tert-butyl benzoic acid. In embodiments, vinyl acetate, vinyl laurate and/or vinyl versatate are used for producing the polymer dispersions. In further embodiments, the monomer, or at least one monomer, is vinyl acetate.

In embodiments, such monomers can be of Formula 1 above, where X is

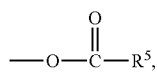

and in further embodiments they can comprise from about 4 to 20 carbon atoms. $R^5$ can be an optionally substituted $C_{1-12}$ alkyl. In embodiments, f in $[CZ_2]_f$ is 0. In embodiments, there are no halide moieties amongst the substituents or optional substituents. In embodiments, all R1 and R2 are independently selected from hydrogen and unsubstituted $C_{1-2}$ alkyl.

Acrylates

In embodiments, at least one monomer is an acrylate-based monomer, for example being selected from acrylic acid, acrylic acid esters, acrylic anhydride, alkyl-acrylic acid, alkyl-acrylic acid esters, and alkyl-acrylic acid anhydrides. Such monomers can comprise, in total, from about 3 to 20, for example from about 3 to 13, carbon atoms. Examples include acrylic acid, methacrylic acid, methyl acrylate, n-propyl acrylate, n-butyl acrylate, iso-butyl acrylate, sec-butyl acrylate, t-butyl acrylate, n-hexyl acrylate, ethyl hexyl acrylate, isobornyl acrylate, methyl methacrylate, ethyl methacrylate, allyl methacrylate, n-butyl methacrylate, isobutyl methacrylate, tert-butyl methacrylate, n-hexyl methacrylate, isobornyl methacrylate, acrylic anhydride, methacrylic anhydride, 2-hydroxyethyl acrylate, 2-hydroxyethyl methacrylate, hydroxypropyl acrylate, hydroxypropylmethacrylate; propylene glycol methacrylate, butanediol monoacrylate, dimethylaminoethyl methacrylate, diethylaminoethyl acrylate and tert-butylaminoethyl methacrylate.

In embodiments, such monomers are of Formula 1, where X is

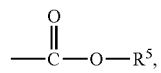

and the monomer in embodiments comprise 3 to 20 carbon atoms.

In other embodiments, X is

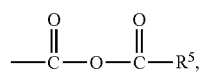

and the monomer in embodiments can comprise from about 4 to 20 carbon atoms. In embodiments, f in $[CZ_2]_f$ is 0.

In embodiments, there are no halide moieties amongst the substituents or optional substituents. In further embodiments, all of $R^1$ and $R^2$ are independently selected from H and optionally substituted $C_{1-10}$ alkyl, and $R^5$ is selected from optionally substituted $C_{1-10}$ alkyl and $C_{1-10}$ alkenyl. In embodiments, all of $R^1$ and $R^2$ are independently selected from H and unsubstituted $C_{1-6}$ alkyl, with all $R^1$ in embodiments being H and $R^2$ being selected from H and unsubstituted $C_{1-2}$ alkyl.

Acrylonitriles

In embodiments, at least one monomer is an acrylonitrile-based monomer, for example being selected from acrylonitrile, alkyl-acrylonitriles and halo-acrylonitriles. Acrylonitrile-based monomers can comprise, in total, from about 3 to 15 carbon atoms, for example from about 3 to 8 carbon atoms. Examples include acrylonitrile, methacrylonitrile, 2-chloroacrylonitrile.

In embodiments, such monomers can be of Formula 1, where X is —CN, and they may optionally have from about 3 to 8 carbon atoms. In embodiments, f in $[CZ_2]_f$ is 0. In embodiments, $R^1$ is not halide, and in further embodiments each $R^1$ is selected from H and optionally substituted $C_{1-10}$ alkyl. In embodiments, $R^2$ is selected from H, halide and optionally substituted $C_{1-10}$ alkyl. In embodiments, each $R^1$ is selected from H and optionally substituted $C_{1-4}$ alkyl, and $R^2$ is selected from H, Cl and optionally substituted $C_{1-4}$ alkyl. In further embodiments, these $C_{1-4}$ groups are unsubstituted.

Styrenes and Dienes

In embodiments, at least one monomer is a styrene-based monomer, for example being selected from styrene and substituted styrenes, typically comprising in the range of from about 8 to 12 carbon atoms.

In embodiments, the styrene-based monomer is of Formula 1, where X is $R^4$. In embodiments, $R^1$ and $R^2$ are selected from H, halide, and optionally substituted $C_{1-6}$ alkyl. In embodiments, $R^4$ is an optionally substituted benzene ring. In embodiments, f in $[CZ_2]_f$ is from about 0 or 1, and in further embodiments it is 0.

Styrene-based monomers are typically copolymerised with a diene monomer, i.e. monomers comprising two or more double bonds, which in embodiments can comprise from about 4 to 15 carbon atoms, for example from about 4 to 10 or from 4 to 6 carbon atoms. Examples include 1,3-butadiene and isoprene.

The diene-based monomer can be selected from those of Formula 2:

  Formula 2

In embodiments, the Formula 2 can comprise from 4 to 15 carbon atoms. In embodiments, no more than two $R^1$ substituents are halide, and in further embodiments, no $R^1$ substituents are halide or contain any halide. In still further embodiments, at least four $R^1$ substituents are H, and in other embodiments all $R^1$ are H. In still further embodiments, all $R^1$ are selected from H and $C_{1-10}$ alkyl and $C_{1-10}$ alkenyl, for example all $R^1$ can be selected from H and $C_{1-5}$ alkyl. In embodiments, the diene-based monomer is halide-free, i.e. no substituents or optional substituents contain any halide moiety.

Other Co-Monomers

At least one monomer can be of Formula 1. Where a mixture of monomers is used, there can also be one or more further monomers of Formula 1 and/or one or more monomers of Formula 2, and or one or more other co-monomers.

Examples of other co-monomers include those defined in (i) to (xiv) below:
(i) $C_{1-20}$ mono-olefins (e.g. $C_{1-8}$ or $C_{1-4}$ mono-olefins), optionally halo-substituted, for example ethene, propene, 1-butene, 2-butene, vinyl chloride and vinylidene chloride.
(ii) Glycol acrylates or glycol esters of alkenyl carboxylates, such as those of formula 3:

Formula 3
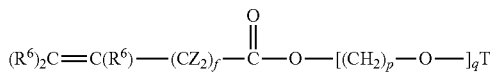

where p is a whole number from about 1 to 3, q is a whole number from about 1 to 10, T is H or unsubstituted $C_{1-3}$ alkyl, and each $R^6$ is independently selected from H, $C_{1-10}$ alkyl, $C_{1-10}$ haloalkyl and $OR^3$. In glycol acrylates, f is $[CZ_2]_f$ is zero. In glycol esters of alkenyl carboxylates, f is greater than zero. An example of a glycol acrylate monomer is ethyldiglycol acrylate.
(iii) Sulfonate group-containing monomers, such as those of Formula 4:

Formula 4
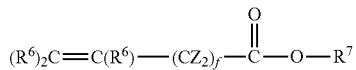

where $R^7$ is —$[C(R^6)_2]_p$—$SO_3H$ or —$N(R^6)$$[C(R^6)_2]_p$—$SO_3H$. In embodiments, f in $[CZ_2]_f$ is zero. Examples include 2-sulfoethyl methacrylate and 2-acrylamido-2-methylpropanesulfonic acid.
(iv) Alkenyl dicarboxylic acids and dicarboxylates, for example those having Formula 5 and their corresponding anhydrides according to Formula 6 or Formula 7:

Formula 5
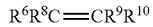

Formula 6
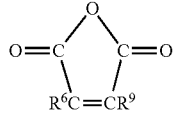

Formula 7
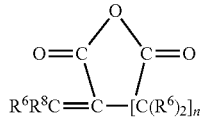

In these formulae, $R^8$ is selected from $R^6$ and —$[C(R^6)_2]_m$—$COOR^{11}$ and m is a whole number in the range of from about 0 to 10; $R^9$ is selected from $R^6$ and —$[C(R^6)_2]_n$—$COOR^{11}$ and n is a whole number in the range of from 1 to 10, with the proviso that one, and only one, of $R^8$ and $R^9$ is $R^6$; $R^{10}$ is —$COOR^{11}$; $R^{11}$ is H or $C_{1-20}$ alkyl or $C_{1-20}$ alkenyl, optionally with one or more substituents selected from halo, hydroxyl or $OR^6$. Examples of these monomers include fumaric acid, maleic acid and itaconic acid, including their anhydrides, esters and diesters, for example divinyl maleate and diallyl maleate.
(v) Dicarbonic acid, and its esters or diesters thereof, for example of Formula 8:

Formula 8
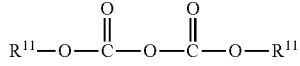

(vi) Epoxy-containing monomers, for example having Formula 9:

Formula 9
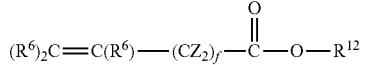

where $R^{12}$ is a $C_{1-20}$ alkyl group, such as a $C_{1-10}$ alkyl group, substituted with at least one epoxy group, and optionally one or more halides. In embodiments, f in $[CZ_2]_f$ is 0. An example is glydicyl methacrylate.

(vii) Dicarboxylate or diacrylate monomers, for example of Formulae 10 to 12:

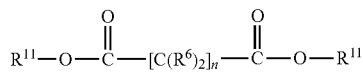

Formula 10

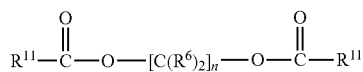

Formula 11

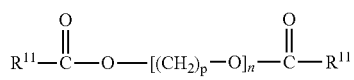

Formula 12 with examples including divinyl adipate, butandiol-1,4-dimethacrylate, hexanedioldiacrylate, and triethyleneglycoldimethacrylate.

(viii) Acrylamide-based monomers of formula 13:

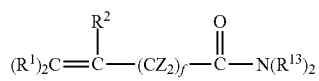

Formula 13 where each $R^{13}$ is independently selected from H and $C_{1-20}$ alkyl optionally substituted with one or more groups selected from hydroxyl, oxygen (in the form of a C=O group), amino, $C_{1-6}$ alkoxy, $C_{1-6}$ alkyl-amino and $C_{1-6}$ dialkyl amino.

Examples include acrylamide, alkyl-acrylamides and aminoalkyl-acrylamides. In embodiments, f in $[CZ_2]_f$ is 0. In embodiments, none of $R^1$ and $R^2$ are halogen, and in further embodiments $R^1$ and $R^2$ are each independently selected from H and optionally substituted $C_{1-10}$ alkyl. In further embodiments, each $R^1$ and $R^2$ are independently selected from hydrogen and unsubstituted $C_{1-4}$ alkyl. In embodiments, each $R^{13}$ is independently selected from $R^3$. Acrylamide-based monomers typically comprise, in total, about 3 to 15 carbon atoms, for example about 3 to 8 carbon atoms, and in embodiments can be selected from acrylamide, methacrylamide, N-(3-dimethylaminopropyl)-methacrylamide, N-hydroxymethylacrylamide, N-hydroxymethylmethacrylamide, N-methylol(meth)acrylamide and N-[2-(dimethylamino)ethyl]methacrylate. These monomers also include the corresponding quaternary ammonium salts, as exemplified by N-[3-(Trimethyl-ammonium)propyl]methacrylamide chloride and N,N-[3-Chloro-2-hydroxypropyl)-3-dimethylammoniumpropyl](meth)acrylamide chloride.

(ix) Ketone group-containing acrylamide- or alkenylamide-based monomers, for example having Formula 14:

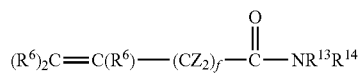

Formula 14 where $R^{14}$ is selected from $C_{1-20}$ alkyl comprising an oxygen substituent (in the form of a C=O group), and optionally comprising one or more additional substituents selected from hydroxyl, oxygen (in the form of a C=O group), amino, $C_{1-6}$ alkoxy, $C_{1-6}$ alkyl-amino and $C_{1-6}$ dialkyl amino. In embodiments, f in $[CZ_2]_f$ is zero. Examples of these compounds include diacetoneacrylamide and diacetonemethacrylamide.

(x) Glycolate acrylamides or alkenylamides, for example those of Formula 15:

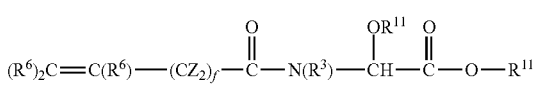

Formula 15

In embodiments, f in $[CZ_2]_f$ is zero. Examples include acrylamidoglycolic acid and methylacrylamidoglycol methyl ether.

(xi) Monomers of Formula 16:

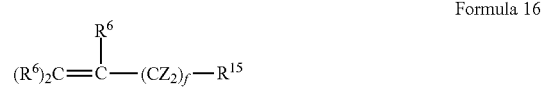

Formula 16 where $R^{15}$ is a $C_{5-8}$ aryl or $C_{5-8}$ heteroaryl group comprising at least one $C_{1-10}$ alkenyl group, optionally substituted with one or more groups selected from hydroxyl, halide, —N(R$^3$)$_2$, nitrile, $C_{1-10}$ alkyl, $C_{1-10}$ haloalkyl, alkoxy and $C_{1-10}$ haloalkoxy. The $C_{5-8}$ aryl or heteroaryl group can comprise one or more further substituents, each selected from hydroxyl, halide, —N(R$^3$)$_2$, nitrile, $C_{1-10}$ alkyl, $C_{1-10}$ haloalkyl, $C_{1-10}$ alkoxy and $C_{1-10}$ haloalkoxy. In embodiments, f in $[CZ_2]_f$ is zero. An example of such a monomer is divinyl benzene.

(xii) Carbamate-based monomers of Formula 17:

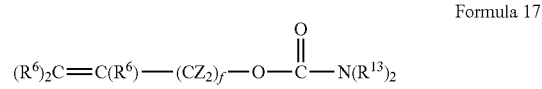

Formula 17

In embodiments, f in $[CZ_2]_f$ is greater than zero, for example 1 or 2. Examples include N-methylolallyl carbamate.

(xiii) $C_{1-20}$ alkenyl cyanurate monomers, such as triallylcyanurate; and (xiv) $C_{1-20}$ alkenyl sulfonic acids, for example $C_{1-10}$ alkenyl sulfonic acids, such as vinyl sulfonic acid.

Relative Quantities of Monomers

The total amount of co-monomers compared to the monomer of Formula 1 (or the monomer of Formula 1 that is present in the highest weight content) can be in the range of from about 0 to 50% by weight, for example in the range of from about 0 to 30 wt %, from about 0 to 20% by weight, or from about 0.1 to 10% by weight. These values are based on the total amount of monomer.

As an example, if there is a monomer (A) of Formula 1, with a content of 80 wt %, a monomer (B) of Formula 1 with a content of 15 wt %, and a monomer (C) not of Formula 1 at 5 wt %, then the amount of co-monomer would be considered to be the sum of monomers (B) and (C), i.e. 20 wt %, since monomer (A) is the monomer of Formula 1 with the highest weight content.

Highly hydrophilic monomers, such as acrylamides and sulfonate based monomers, e.g. as listed in (iii), (xiii), (ix) and (x) above, are typically avoided, or at least if present, they cumulatively represent less than 5 wt % of the total monomer content.

Example Co-Monomer Combinations

Examples of co-monomer combinations that can be used to make a polymer dispersion as contemplated herein include ethylene-vinylacetate, ethylene-vinylacetate-vinylversatate, ethylene-vinylacetate-(meth)acrylate, ethylene-vinylacetate-vinylchloride, vinylacetate-vinylversatate, vinylacetate-vinylversatate-(meth)acrylate, vinylversatate-(meth)acrylate, acrylate-methacrylate, styrene-acrylate and styrene-butadiene.

It is preferred that the monomer, or at least one monomer, is an optionally substituted vinyl carboxylate according to Formula 1, where X is

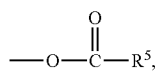

f is zero, R1 and R2 are both hydrogen, and R5 is H or unsubstituted C1-4 alkyl. In further embodiments, a monoolefin or halo-substituted monoolefin is a co-monomer.

The polymer or mixture of polymers in the polymer dispersion can, in embodiments, contain from about 0 to 70 mol % of vinyl carboxylate monomer units (e.g. vinyl acetate), based on the respective total monomer component of the individual polymers. In embodiments, the vinyl carboxylate content is about 65 mol % or less. In a further embodiment, the content is about 60 mol % or less, for example about 55 mol % or less. The content of vinyl carboxylate is, in embodiments, 5 mol % or more, for example about 10 mol % or more, and in further embodiments about 20 mol % or more.

In embodiments, an acrylate-based monomer can be a co-monomer, for example about 2 to 80% by weight of total monomer. These can be of Formula 1, where X is

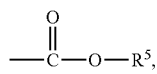

f is zero, $R^1$ is H, $R^2$ is H or methyl, and $R^5$ is H or unsubstituted $C_{1-4}$ alkyl. In embodiments, from about 5 to 60% by weight of acrylate-based monomer is included, or in another aspect from about 10 to 50% by weight, for example from about 15 to 35% by weight.

In embodiments, where there are carboxylate group-containing monomers, the component of carboxylic acid groups does not exceed 10% by weight of the total carboxylate groups. In further embodiments, this figure does not exceed 5% by weight, and in further embodiments, the figure does not exceed 3% by weight.

Initiators

Polymerisation is carried out in the presence of an initiator. The initiator is water-soluble, or at least partially water-soluble. The initiator can be present in the aqueous phase before the aqueous and organic phases are mixed. Alternatively, it can be added either at the same time as or after mixing the organic and aqueous phases. In embodiments, at least some (typically at least 90 mol % or at least 95 mol %) of the initiator remains in the aqueous phase when the polymerisation reaction commences. Initiators are typically radical-generating initiators, and are well known in the art. Typical examples include at least partially water-soluble inorganic peroxides, organic peroxides, peroxydicarbonates and azo compounds.

Examples of inorganic peroxides include hydrogen peroxide, salts containing $SO_5{}^{2-}$ or $S_2O_8{}^{2-}$ ions such as ammonium persulfate, sodium persulfate and potassium persulfate, and peroxydiphosphates such as ammonium or alkali metal peroxydiphosphate (e.g potassium peroxydiphosphate).

Examples of azo compounds include those of Formula $R^{16}$—N=N—$R^{17}$, where $R^{16}$ and $R^{17}$ can be the same or different, and each can be selected from H, $C_{1-4}$ alkyl and $C_{1-4}$ alkenyl. Any of the $C_{1-4}$ alkyl, $C_{1-4}$ alkenyl groups can be optionally substituted with one or more substituents selected from halogen, hydroxyl, $C_{1-4}$ alkoxy, carboxyl groups of formula $COOR^{18}$, nitrile, amines of formula $N(R^{18})_2$ and amidines of formula —$C(NR^3)N(R^3)_2$. $R^{18}$ is H or $C_{1-4}$ alkyl. Examples include 2,2'-azobis(2-methylpropionamidine), optionally in the form of a dihydrochloride or diacetatic acid salts, and also nitrile-containing azo compounds such as 4,4'-azobis(4-cyanovaleric acid) and 2,2'-azobis(2-methylpropionitrile).

Organic peroxides include those of formulae 18 to 20:

Formula 18

Formula 19

Formula 20 where $R^{19}$ is selected from $C_{1-10}$ alkyl, $C_{1-10}$ alkenyl, and —$[CZ_2]_f$—$R^{20}$. Any of the $C_{1-10}$ alkyl or $C_{1-10}$ alkenyl groups can optionally be substituted with one or more substituents selected from halogen, hydroxyl, carboxyl groups of formula $COOR^{18}$, nitrile, amines of formula $N(R^{18})_2$ and $C_{1-4}$ alkoxy. In embodiments, f is from about 0 to 2.

$R^{20}$ on each occurrence is independently selected from $C_{5-6}$ aryl and $C_{5-6}$ heteroaryl groups. The aryl or heteroaryl groups can optionally be substituted with one or more groups selected from hydroxyl, halide, —$N(R^{18})_2$, nitrile, $C_{1-3}$ alkyl, $C_{1-3}$ haloalkyl, $C_{1-3}$ alkoxy and $C_{1-3}$ haloalkoxy. The heteroaryl group comprises one or more heteroatoms in the ring, each independently selected from O, S and N.

$R^{21}$ is selected from H and $R^{19}$.

y is 1 or 2.

Examples of organohydroperoxides include those of Formula 18 above, where at least one R18 (or all R18) is hydrogen. Specific examples include cumene hydroperoxide and t-butyl hydroperoxide.

Examples of diorganoperoxides include those of Formula 18 above, where at least one R20 (or all R20) are not hydrogen, for example di tert-butyl peroxide, bis(tert-butylperoxy)cyclohexane.

Examples of peracids include those of Formulae 19 above, where R20 is hydrogen, for example peroxo-carboxylic acids such as peracetic acid.

Examples of diorganoperoxides of Formula 20 include those where both R19 are —[CZ2]f-R20, with a specific example being benzoyl peroxide.

Peroxydicarbonates include compounds with the anion $[O_2C—O—O—CO_2]^{2-}$, and can be provided as alkali metal salts, for example lithium peroxydicarbonate, sodium peroxydicarbonate and potassium peroxydicarbonate.

Other initiators that can be used include reduction agents such as sodium, potassium or ammonium salts of sulfite and bisulfite; sodium, potassium or zinc formaldehyde sulfoxylate, and ascorbic acid.

Further types of initiators include oxidizing agents which, by thermal decomposition, can form free radicals, and also catalytic initiator systems such as the system H2O2/Fe2+/H+.

The content of initiators based on the amount of monomer can be in the range of about 0.01 to 5% by weight, for example in the range of from about 0.1 to 3% by weight.

Polymer Dispersion Formation

In embodiments, an organic emulsion is formed typically by mixing the organic monomer phase, and an aqueous phase. In embodiments, the radical initiator is at least partially soluble in the aqueous phase. It can be included in the aqueous phase before mixing with the organic phase. In other embodiments, it can be added to the aqueous phase at the same time as the organic phase. The continuous phase of the emulsion is the aqueous phase, with the organic phase being the dispersed phase, i.e. an "oil-in-water" type emulsion.

The polymerisation can take place in a batch-process, in a continuous process, or in a semi-continuous process. In one embodiment, the initiator and monomers can be added over a period of time, for example to help control the rate of reaction and the temperature increase in the system as a result of the exothermic reaction.

The result is the formation of an aqueous dispersion of polymeric particles.

Stabilisers

Various additives can be added to help stabilise the emulsion or dispersion. In the present disclosure, at least one of these stabilisers is a protective colloid stabiliser.

Examples include cold water-soluble biopolymers. In one embodiment, these can be selected from polysaccharides and polysaccharide ethers, such as cellulose ethers, starch ethers (amylose and/or amylopectin and/or their derivatives), guar ethers, dextrins and/or alginates, heteropolysaccharides which may have one or more anionic, nonionic or cationic groups, such as xanthan gum, welan gum and/or diutan gum. These may be chemically modified, for example containing carboxymethyl, carboxyethyl, hydroxyethyl, hydroxypropyl, methyl, ethyl, propyl, sulfate, phosphate and/or long-chain (e.g. C4-26) alkyl groups.

Further examples include peptides and/or proteins such as gelatine, casein and/or soy protein.

In embodiments, the biopolymer is selected from dextrins, starches, starch ethers, casein, soy protein, gelatine, hydroxyalkyl-cellulose and/or alkyl-hydroxyalkyl-cellulose, wherein the alkyl group may be the same or different and can be a $C_{1-4}$ alkyl group, in particular a methyl, ethyl, n-propyl- and/or i-propyl group.

Other examples of protective colloids include synthetic polymers selected from polyvinyl alcohols, partially hydrolyzed polyvinyl acetates, polyacrylates, polyvinylpyrrolidones and polyvinylacetals.

Polyvinyl pyrrolidone and/or polyvinylacetals typically have a molecular weight of about 2000 to 400,000.

Polyvinyl alcohol (PVOH) is typically synthesised by hydrolysis of polyvinyl acetate to form a fully or partly saponified (hydrolysed) polyvinyl alcohol. The degree of hydrolysis is typically in the range of from about 70 to 100 mol %, for example in the range of from about 80 to 98 mol %. The PVOH typically has a Hoppler viscosity in 4% aqueous solution of about 1 to 60 mPas, for example in the range of from about 3 to 40 mPas (measured at 20° C. according to DIN 53015).

In embodiments, the polyvinyl alcohol can be modified, for example by converting at least a portion of the —OH groups C1-4 alkoxy groups, optionally having an OH substituent, or polyether groups such as —O—[(CH2)aO-]bH, where a is 2 or 3, and b is from about 1 to 10, for example from about 1 to 5.

A skilled person knows examples of protective colloids that are suitable for use in the disclosure, for example from U.S. Pat. Nos. 3,769,248, 6,538,057 and WO2011/098412.

One or more protective colloids can be used. In addition, they can be used in combination with other stabilisers or emulsifiers.

Suitable emulsifiers include anionic, cationic and nonionic emulsifiers. Examples include melamine-formaldehyde-sulfonates, naphthalene-formaldehyde-sulfonates, block copolymers of propylene oxide and ethylene oxide, styrene-maleic acid and/or vinyl ether maleic acid copolymers. Higher-molecular oligomers can be non-ionic, anionic, cationic and/or amphoteric surfactants such as alkyl sulfonates, alkylaryl sulfonates, alkyl sulfates, sulfates of hydroxylalkanoles, alkyl and alkylaryl disulfonates, sulfonated fatty acids, sulfates and phosphates of polyethoxylated alkanoles and alkyl phenols, as well as esters of sulfo-ambric acid quaternary alkyl ammonium salts, quaternary alkyl phosphonium salts, polyaddition products such as polyalkoxylates, for example, adducts of 5 to 50 mol of ethylene oxide and/or propylene oxide per mol on linear and/or branched C6-22 alkanols, alkyl phenols, higher fatty acids, higher fatty acid amines, primary and/or secondary higher alkyl amines, wherein the alkyl group in each case can be a linear and/or branched C6-22 alkyl group.

Useful synthetic stabilization systems include partially saponified, and optionally, modified, polyvinyl alcohols, wherein one or several polyvinyl alcohols can be employed together, if applicable, with minor quantities of suitable surfactants. Amounts of the stabilization systems based on monomer component employed can be in the range of from about 1 to 30% by weight, or in other embodiments from about 3 to 15% by weight.

In certain embodiments, the protective colloid is a polyvinyl alcohol, fully or partly saponified, and having a degree of hydrolysis in the range of from about 70 to 100 mol %, or in another embodiment in the range of from about 80 to 98 mol %. The Hoppler viscosity in 4% aqueous solution can be about 1 to 60 mPas, or in other embodiments in the range of from about 3 to 40 mPas (measured at 20° C. according to DIN 53015).

The disclosure relates to improving the properties of a polyvinyl acetate-based adhesive composition by incorporation of a modified colloidal silica, such that the properties of the pre-dried and post-dried adhesive composition are improved.

The adhesive composition comprises polyvinyl acetate or a polyvinyl acetate copolymer, where vinyl acetate monomer is polymerised in the presence of one or more additional monomers. Mixtures of polyvinyl acetate with one or more polyvinyl acetate copolymers can also be used, as can mixtures of more than one polyvinyl acetate copolymer.

Polymer Properties

In embodiments, the polymer in the polymer dispersion has a glass transition temperature Tg in the range of from about −60 to +80° C. The dispersion can, in embodiments, comprise two different polymers, with different glass transition temperatures (for example as described in U.S. Pat. No. 8,461,247). In embodiments, the $T_g$ of one or more than one of the different polymers in a mixture of polymers is within the above range.

Where copolymers are present, the glass transition temperature of the copolymer can either be calculated empirically or determined experimentally. Empirical calculation can be accomplished by use of the Fox equation (T. G. Fox, Bull. Am. Phy. Soc. (Ser II) 1, 123 (1956), and Ullmann's Encyclopedia of Industrial Chemistry, VCH, Weinheim, Vol. 19, 4th Ed., Publishing House Chemistry, Weinheim, 1980, pp. 17-18) as follows:

$$\frac{1}{T_g} = \frac{X_a}{T_{gA}} + \frac{X_b}{T_{gB}} + \ldots + \frac{X_n}{T_{gN}}$$

wherein $X_a$ and $X_b$ are the mass fractions of monomers A and B employed in the copolymer (in % by weight), and $T_{gA}$ and $T_{gB}$, are the glass transition temperatures $T_g$ in Kelvin of the respective homopolymers A and B. These can be found, for example, in Ullmann's Encyclopedia of Industrial Chemistry, VCH, Weinheim, Vol. A21 (1992), p. 169.

Experimental determination can be undertaken by known techniques, such as differential scanning calorimetry (DSC), wherein the midpoint temperature according to ASTM D3418-82 should be used.

The minimum film-forming temperature as determined by DIN 53787 of a 50% aqueous composition is in embodiments 40° C. or less, for example 25° C. or less. In further embodiments, it is 15° C. or less. This can be tailored by selecting polymers of appropriate $T_g$ values, and also by using mixtures of polymers. Plasticisers can also be used, for example those described in U.S. Pat. No. 4,145,338.

The volatile organic content (VOC) of the aqueous adhesive composition is preferably less than about 5000 ppm, for example less than about 2000 ppm, such as less than about 1000 ppm, or less than about 500 ppm based on polymer content. Volatile in this context refers to organic compounds having a boiling point of less than about 250° C. at standard (atmospheric) pressure.

Other Components

Other components that can be present in the adhesive composition include modified polyvinyl alcohols; polyvinyl pyrrolidones; defoaming agents; wetting agents; alkyl, hydroxyalkyl and/or alkylhydroxyalkyl polysaccharide ethers such as cellulose ethers, starch ethers and/or guar ethers, wherein the alkyl and hydroxyalkyl group typically comprise a $C_{1-4}$ group, and synthetic polysaccharides such as anionic, nonionic or cationic heteropolysaccharides, such as xanthan gum or Welan gum; cellulose fibres; tackifiers; defoaming agents; dispersing agents; superplasticisers; hydration accelerators; hydration retarders; thickeners, air-entraining admixtures; polycarboxylate ethers; polyacrylamide; polyalkylene oxides and polyalkylene glycols wherein the alkylene group is typically a $C_2$ and/or $C_3$ group, water repellants such as silanes, siloxanes or fatty acid esters, fillers such as carbonates, silicates, precipitated silicic acids, pozzolanes such as meta-kaolin and/or latent hydraulic components. The content of optional additives based on the polymer content is typically in the range of from about 0.01 to 250% by weight, for example from about 0.1 to 100% by weight, and preferably from about 1 to 25% by weight.

Organosilane-Modified Colloidal Silica

In making the adhesive composition of the present disclosure, a modified colloidal silica can added to the aqueous phase. In the discussion below, the terms "colloidal silica" and "silica sol" are synonymous.

The modified colloidal silica in one embodiment is an organosilane-functionalised colloidal silica, which can be made by conventional processes, as described for example in WO2004/035473 or WO2004/035474. This organosilane-functionalised colloidal silica comprises colloidal silica particles modified with a hydrophilic organosilane moiety. The organosilane moiety is hydrophilic, such that the modified colloidal silica mixes with the aqueous phase of the composition.

Typically, the organosilane-functionalised colloidal silica is formed from a reaction between one or more organosilane reactants, which can be expressed generally by the formula $A_{4-y}Si-[R^m]_y$, and one or more silanol groups on the silica surface, i.e. $[SiO_2]$—OH groups. The result is a silica surface comprising one or more organosilane moieties attached to the surface.

In the organosilane reactant, each "A" is typically independently selected from $C_{1-6}$ alkoxy, $C_{1-6}$ haloalkoxy, hydroxy and halide. Other options are the use of siloxanes, e.g. of formula $[R^m]_b A_{3-b} Si\{-O-SiA_{2c}[R^m]_c\}_a-O-SiA_{3-b}[R^m]_b$, where a is 0 or an integer of 1 or more, typically from 0 to 5; b is from about 1 to 3; and c is from about 1 to 2.

Other examples include disilazanes, of formula $\{[R^m]_b A_{3-b} Si\}_2$—NH where b is from 1 to 3. Of the haloalkoxy groups, fluoro and chloro are preferred halo substituents.

Alkoxy groups and halides are often preferred as the "A" species. Of the halides, chloride is a suitable choice. Of the alkoxy groups, $C_{1-4}$ alkoxy groups, such as methoxy, ethoxy, propoxy or isopropoxy, are suitable choices. In embodiments, the organosilane reactant can undergo a prehydrolysis step, in which one or more "A" groups are converted to —OH, as described for example by Greenwood and Gevert, Pigment and Resin Technology, 2011, 40(5), pp 275-284.

The organosilane reactant can react with a surface silanol group to form from one to three Si—O—Si links between the silica surface and the organosilane silicon atom, i.e. $\{[SiO_2]-O-\}_{4-y-z}-Si[A]_z[R^m]_y$ where z is typically from 0 to 2, y is typically from 1 to 3, and 4-y-z is from 1 to 3, and usually in the range of from about 1 to 2. A corresponding number of "A" groups are removed from the organosilane as a result. Remaining "A" groups can be converted to other groups as a result of reaction (e.g. hydrolysis) under the conditions experienced in the silanisation reaction. For example, if "A" is an alkoxy unit or a halide, it can convert to a hydroxy group.

It is also possible for at least a portion of the organosilane to be in a dimeric form or even oligomeric form before binding to the colloidal silica, i.e. where the two or more organosilane moieties are bound to each other through Si—O—Si bonds.

The chemically bound organosilane groups can be represented by the formula $[\{SiO2\}\text{-O-}]4\text{-y-}_z\text{—Si}[D]_z[R''']_y$. The group $\{SiO_2\}$—O— represents an oxygen atom on the silica surface. The organosilane silicon atom has at least one, and optionally up to three such bonds to the silica surface, where 4-y-z is from about 1 to 3, and usually in the range of from about 1 to 2, i.e. 4-y-z is at least about 1, and no more than about 3. Group "D" is optionally present, and z is in the range of from about 0 to 2. The organosilane silicon atom has from about 1 to 3 [$R'''$] groups, i.e. y is from about 1 to 3, typically from about 1 to 2. Where there is more than 1 $R'''$ group, they can be the same or different.

When z is not zero, the organosilane silicon contains unreacted "A" groups, and/or contains hydroxyl groups where the "A" group has been removed, for example through a hydrolysis reaction. Alternatively or additionally, an Si—O—Si link can be formed with the silicon atom of a neighbouring organosilane group. Thus, in the formula $\{[SiO_2]\text{—O—}\}_{4\text{-y-z}}\text{—Si}[D]_z[R''']_y$, group "D" can (on each occurrence) be selected from the groups defined under "A" above, and also from hydroxy groups and —O—[SiR''']' groups where the [SiR''']' group is a neighbouring organosilane group.

$R'''$ is an organic moiety, comprising from about 1 to 16 carbon atoms, for example from about 1 to 12 carbon atoms, or from about 1 to 8 carbon atoms. It is bound to the organosilane silicon by a direct C—Si bond.

Where there is more than one $R'''$ group (i.e. if y is greater than 1), then each $R'''$ can be the same or different.

$R'''$ is a hydrophilic moiety, whose nature is such that the modified colloidal silica is miscible with the aqueous phase, in preference to the organic phase. In embodiments, $R'''$ comprises at least one group selected from hydroxyl, thiol, carboxyl, ester, epoxy, acyloxy, ketone, aldehyde, (meth) acryloxy, amino, amido, ureido, isocyanate or isocyanurate. In further embodiments, hydrophilic moieties comprise at least one heteroatom selected from O and N, and comprise no more than three consecutive alkylene (—CH$_2$—) groups linked together.

$R'''$ can comprise alkyl, alkenyl, epoxy alkyl, aryl, heteroaryl, $C_{1-6}$ alkylaryl and $C_{1-6}$ alkylheteroaryl groups, optionally substituted with one or more groups selected from ERR, subject to $R'''$ overall being hydrophilic as defined above.

In $ER''$, E is either not present, or is a linking group selected from —O—, —S—, —OC(O)—, —C(O)—, —C(O)O—, —C(O)OC(O)—, —N($R^p$)—, —N($R^p$)C(O)—, —N($R^p$)C(O)N($R^p$)— and —C(O)N($R^p$)— where $R^p$ is H or $C_{1-6}$ alkyl.

$R''$ is linked to E, or directly to $R'''$ if E is not present, and is selected from halogen (typically F, Cl or Br), alkyl, alkenyl, aryl, heteroaryl, $C_{1-3}$ alkylaryl and $C_{1-3}$ alkylheteroaryl. $R''$ can optionally be substituted with one or more groups selected from hydroxyl, halogen (typically F, Cl or Br), epoxy, —$OR^p$ or —N($R^p$)$_2$ where each $R^p$ is as defined above. If E is present, $R''$ can also be hydrogen.

In the above definitions, alkyl and alkenyl groups can be aliphatic, cyclic or can comprise both aliphatic and cyclic portions. Aliphatic groups or portions can be linear or branched. Where any group or substituent comprises halogen, the halogen is preferably selected from F, Cl and Br.

Some groups can undergo hydrolysis reactions under conditions experienced in the colloidal silica medium. Thus, groups containing moieties such as halide, acyloxy, (meth) acryloxy and epoxy groups can hydrolyse to form corresponding carboxyl, hydroxyl or glycol moieties.

In embodiments, one or more $R'''$ groups are $C_{1-8}$ alkyl, $C_{1-8}$ haloalkyl, $C_{1-8}$ alkenyl or $C_{1-8}$ haloalkenyl, typically $C_{1-8}$ alkyl or $C_{1-8}$ alkenyl, with an optional halide (e.g. chloride) substituent. Examples include methyl, ethyl, chloropropyl, isobutyl, cyclohexyl, octyl and phenyl. These $C_{1-8}$ groups can, in embodiments, be $C_{1-6}$ groups or, in further embodiments, $C_{1-4}$ groups. Longer carbon chains tend to be less soluble in an aqueous system, which makes synthesis of the organosilane-modified colloidal silica more complex.

In embodiments, $R'''$ is a group comprising from about 1 to 8 carbon atoms, e.g. a $C_{1-8}$ alkyl group, and which additionally comprises an $ER''$ substituent where E is oxygen and $R''$ is selected from optionally substituted $C_{1-8}$-epoxyalkyl and $C_{1-8}$ hydroxyalkyl. Alternatively, $R''$ can be optionally substituted alkylisocyanurate. Examples of such $ER''$ substituents include 3-glycidoxypropyl and 2,3-dihydroxypropoxypropyl.

In embodiments, $R'''$ is a group comprising from 1 to 8 carbon atoms, e.g. a $C_{1-8}$ alkyl group, and which additionally comprises an $ER''$ substituent where E is not present, and $R''$ is epoxyalkyl, for example an epoxycycloalkyl. An example of such an $R'''$ group is beta-(3,4-epoxycyclohexyl)ethyl. The epoxy group can alternatively be two neighbouring hydroxyl groups, e.g. $R''$ can be a dihydroxyalkyl such as a dihydroxycycloalkyl, and $R'''$ being (3,4-dihydroxycyclohexyl)ethyl.

There can be more than one different organosilane in the modified colloidal silica, for example where the organosilane-modified silica is produced by reacting a mixture of two or more organosilanes with colloidal silica, or by mixing two or more separately prepared organosilane-modified colloidal silicas.

In embodiments, the colloidal silica can be modified by more than one organosilane moiety. The additional organosilane moieties do not necessarily themselves have to be hydrophilic in nature. For example, they can be hydrophobic silanes, such as $C_{1-20}$ alkyl or alkenyl silane. However, the resulting modified colloidal silica should still be miscible with the aqueous phase.

Examples of organosilane reactants that can be used to make such functionalised colloidal silica include octyl triethoxysilane; methyl triethoxysilane; methyl trimethoxysilane; tris-[3-(trimethoxysilyl)propyl]isocyanurate; 3-mercaptopropyl trimethoxysilane; beta-(3, 4-epoxycyclohexyl)-ethyl trimethoxysilane; silanes containing an epoxy group (epoxy silane), glycidoxy and/or a glycidoxypropyl group such as 3-(glycidoxypropyl) trimethoxy silane (which can also be known as trimethoxy[3-(oxiranylmethoxy)propyl] silane), 3-glycidoxypropyl methyldiethoxysilane, (3-glycidoxypropyl) triethoxy silane, (3-glycidoxypropyl) hexyltrimethoxy silane, beta-(3, 4-epoxycyclohexyl)-ethyltriethoxysilane; 3-methacryloxypropyl trimethoxysilane, 3-methacryloxypropyl triisopropoxysilane, 3-methacryloxypropyl triethoxysilane, octyltrimethoxy silane, ethyltrimethoxy silane, propyltriethoxy silane, phenyltrimethoxy silane, 3-mercaptopropyltriethoxy silane, cyclohexyltrimethoxy silane, cyclohexyltriethoxy silane, dimethyldimethoxy silane, 3-chloropropyltriethoxy silane, 3-methacryloxypropyltrimethoxy silane, i-butyltriethoxy silane, trimethylethoxy silane, phenyldimethylethoxy silane, hexamethyldisiloxane, trimethylsilyl chloride, ureidomethyltriethoxy silane, ureidoethyltriethoxy silane, ureidopropyltriethoxy silane, hexamethyldisilizane, and mixtures thereof. U.S. Pat. No. 4,927,749 discloses further suitable silanes which may be used to modify the colloidal silica.

In embodiments, the organosilane or at least one organosilane comprises epoxy groups, for example as found in epoxyalkyl silanes or epoxyalkyloxyalkyl silanes. In embodiments, the organosilane can comprise a hydroxyl-substituent group, for example selected from hydroxyalkyl and hydroxyalkyloxyalkyl groups comprising one or more hydroxyl groups, e.g. about 1 or 2 hydroxyl groups. Examples include organosilanes containing a glycidoxy, glycidoxypropyl, dihydropropoxy or dihydropropoxypropyl group. These can be derived from organosilane reactants such as (3-glycidoxypropyl)trimethoxysilane, (3-glycidoxypropyl)triethoxysilane and (3-glycidoxypropyl)methyldiethoxysilane. In the compositions of the disclosure, epoxy groups can hydrolyse to form corresponding vicinal diol groups. Therefore, the disclosure also encompasses the diol equivalents of the above epoxy group-containing compounds.

The silane compounds can form stable covalent siloxane bonds (Si—O—Si) with the silanol groups. In addition, they can be linked to the silanol groups, e.g. by hydrogen bonds, on the surface of the colloidal silica particles. It is possible that not all silica particles become modified by organosilane. The proportion of colloidal silica particles that become functionalised with organosilane will depend on a variety of factors, for example the size of the silica particles and the available surface area, the relative amounts of organosilane reactant to colloidal silica used to functionalise the colloidal silica, the type of organosilane reactants used and the reaction conditions.

The degree of modification (DM) of silica surface by organosilane can be expressed according to the following calculation (Equation 1), in terms of the number of silane molecules per square nanometre of silica surface:

$$DM = \frac{A \times N_{organosilane}}{(S_{silica} \times M_{silica} \times 10^{18})} \quad \text{Equation 1}$$

wherein:
DM is the degree of surface modification in units of $nm^{-2}$;
A is Avogadro's constant;
$N_{organosilane}$ is the number of moles of organosilane reactant used;
$S_{silica}$ is the surface area of the silica in the colloidal silica, in $m^2\ g^{-1}$; and
$M_{silica}$ is the mass of silica in the colloidal silica, in g.

DM can be at least about 0.8 molecules of silane per $nm^2$, and is preferably in the range of from about 0.5 to 4 molecules per $nm^2$. Preferred embodiments have DM in the range of from about 0.5 to 3, for example from about 1 to 2.

In the above equation, the surface area of the silica is conveniently measured by Sears titration.

The colloidal silica used in the composition of the present disclosure is a stable colloid. By "stable" is meant that the organosilane-functionalised colloidal silica particles dispersed in the (usually aqueous) medium does not substantially gel or precipitate within a period of at least 2 months, and preferably at least 4 months, more preferably at least 5 months at normal storage at room temperature (20° C.).

Preferably, the relative increase in viscosity of the silane-functionalised colloidal silica dispersion between its preparation and up to two months after preparation is lower than about 100%, more preferably lower than about 50%, and most preferably lower than about 20%.

Preferably, the relative increase in viscosity of the silane-functionalised colloidal silica between its preparation and up to four months after preparation is lower than about 200%, more preferably lower than about 100%, and most preferably lower than about 40%.

Colloidal Silica Modified with Additional Element

The silica particles within the modified colloidal silica can additionally or instead be modified with one or more additional elements on the surface. The one or more elements are formally able to adopt the +3 or +4 oxidation state, for example being able to form solid oxides at room temperature having stoichiometry $M_2O_3$ or $MO_2$. In embodiments, these are other elements in Groups 13 and 14 of the periodic table selected from the second to fifth periods (i.e. Ge, Sn, B, Al, Ga, In), and also transition elements in the fourth and fifth periods of the transition metals, such as Ti, Cr, Mn, Fe or Co. Zr and Ce can also be used as the surface-modifying element. In embodiment, the additional element is selected from B, Al, Cr, Ga, In, Ti, Ge, Zr, Sn and Zr. In particular embodiments, the element is selected from aluminium, boron, titanium and zirconium. In other embodiments, it is selected from aluminium and boron, and in further embodiments it is aluminium.

Various methods can be used to prepare colloidal silica with one or more additional elements on the surface of the colloidal silica particles. Boron-modified silica sols are described in U.S. Pat. No. 2,630,410, for example, and a procedure for preparing an alumina-modified silica sol can be found in "The Chemistry of Silica", by Iler, K. Ralph, pages 407-409, John Wiley & Sons (1979). Other references include U.S. Pat. Nos. 3,620,978, 3,719,607, 3,745,126, 3,864,142, 3,956,171, 5,368,833, WO2005/097678 and co-pending European patent application number 18159789.9.

The amount of one or more additional elements (expressed in terms of their oxide) based on the total amount of insoluble colloidal silica (expressed as $SiO_2$) and additional elements (expressed as oxide) is typically in the range of from about 0.05 to 3 wt %, for example in the range of from about 0.1 to 2 wt %.

Alumina-modified silica particles suitably have an $Al_2O_3$ content of from about 0.05 to about 3 wt %, for example from about 0.1 to about 2 wt %, or from about 0.1 to 0.8 wt %.

These amounts are typically over and above the amount of impurity oxides in the colloidal silica itself, which are typically no more than about 400 ppm in total (expressed as oxides).

In embodiments, the extent of modification with the modifying element is such that the colloidal silica comprises 18.4 µmol of the one or more modifying elements per $m^2$ of the colloidal silica particles. Typically, the amount is also less than 33 µmol $m^{-2}$. For example, the amount can be in the range of from about 18.4 to 33 µmol $m^{-2}$, such as in the range of from about 20 to 31 µmol $m^{-2}$, for example in the range from about 21 to 29 µmol $m^{-2}$. The amount of one or more modifying elements is calculated on an elemental basis (i.e. the molar quantity of individual atoms of the one or more modifying elements).

Where the colloidal silica particles are surface modified both with an additional element, and with an organosilane, they are typically prepared by adding organosilane to the additional element-modified colloidal silica.

Colloidal Silica

In embodiments, the colloidal silica used in preparing modified colloidal silica contains only traces of other oxide impurities, which will typically be present at less than about 1000 ppm (in the total sol) by weight for each oxide impurity. Typically, the total amount of non-silica oxide impurities present in the sol is less than about 5000 ppm by weight, preferably less than about 1000 ppm.

The colloidal silica particles suitably have an average particle diameter (on a volume basis) ranging from about 2 to 150 nm, for example from about 3 to 60 nm, such as from about 4 to 25 nm. In further embodiments, the average particle diameter is in the range of from about 5 to 20 nm. Suitably, the colloidal silica particles have a specific surface area from about 20 to 1500 m2 g-1, preferably from about 50 to 900 m2 g-1, and more preferably from about 70 to 600 m2 g-1, for example from about 100 to 500 m2 g-1 or from about 150 to 500 m2 g-1.

The surface areas are often expressed as the surface areas of the "bare" or "unfunctionalised" colloidal silicas that are used for the synthesis. This is because functionalisation of a silica surface can complicate the surface area measurements. Surface areas can be measured using Sears titration (G. W. Sears; Anal. Chem., 1956, 28(12) pp 1981-1983). The particle diameter can be calculated from the titrated surface area using a method described in "The Chemistry of Silica", by Iler, K. Ralph, page 465, John Wiley & Sons (1979). Based on the assumption that the silica particles have a density of 2.2 g cm$^{-3}$, and that all particles are of the same size, have a smooth surface area and are spherical, then the particle diameter can be calculated from Equation 2:

$$\text{Particle diameter (nm)} = \frac{2720}{\text{Surface Area (m}^2\text{g}^{-1}\text{)}} \quad \text{Equation 2}$$

The colloidal silica particles are typically dispersed in water in presence of stabilising cations, which are typically selected from K+, Na+, Li+, NH4+, organic cations, quaternary amines, tertiary amines, secondary amines, and primary amines, or mixtures thereof so as to form an aqueous silica sol. Dispersions can also comprise organic solvents, typically those that are water miscible e. g. lower alcohols, acetone or mixtures thereof, preferably in a volume ratio to water of about 20% or less. Preferably, no solvents are added to the colloidal silica or functionalised colloidal silica. Organic solvents in the composition can arise during synthesis of the organosilane-functionalised colloidal silica, due to reaction of organosilane reactant with the silica. For example, if the organosilane reactant is an alkoxide, then the corresponding alcohol will be produced. The amount of any organic solvent is preferably kept below about 20% by weight, preferably less than about 10% by weight.

The silica content of the organo-functionalised colloidal silica is preferably in the range of from 5 to 60% by weight, more preferably from 10 to 50%, and most preferably from about 15 to 45%. This is expressed as weight % of unfunctionalised silica, and is calculated from the weight % of silica in the colloidal silica source before modification with organosilane.

The pH of the modified colloidal silica is suitably in the range of from about 1 to 13, preferably from about 2 to 12, such as from about 4 to 12, or from about 6 to 12, and most preferably from about 7.5 to 11. Where the silica is modified with an additional element, such as aluminium, the pH is suitably in the range of from about 3.5 to 11.

The organofunctionalised colloidal silica suitably has an S-value from about 20 to 100, preferably from about 30 to 90, and most preferably from about 40 to 90.

The S-value characterises the extent of aggregation of colloidal silica particles, i.e. the degree of aggregate or microgel formation. The S-value can be measured and calculated according to the formulae given in Iler, R. K. & Dalton, R. L. in J. Phys. Chem., 60 (1956), 955-957.

The S-value is dependent on the silica content, the viscosity, and the density of the colloidal silica. A high S-value indicates a low microgel content. The S-value represents the amount of SiO2 in percent by weight present in the dispersed phase of a silica sol. The degree of microgel can be controlled during the production process as further described in e.g. U.S. Pat. No. 5,368,833.

As with surface area, the S-value of organosilane-functionalised colloidal silica is typically expressed as the S-value of the colloidal silica before silane modification.

In embodiments, the weight ratio of organosilane to silica in the organosilane-functionalised silica sol is from about 0.003 to 1.5, preferably from about 0.006 to 0.5, and most preferably from about 0.015 to 0.25.

In this context, the weight of organosilane in the dispersion is calculated as the total amount of possible free organosilane compounds and organosilane derivatives or groups bound or linked to the silica particles, i.e. based on the total amount of organosilane reactant(s) initially added to the colloidal silica to produce the organosilane modified silica, and not necessarily based on a direct measure of how much organosilane is actually chemically bound to the silica.

In the aqueous phase in preparation of the adhesive composition, the modified colloidal silica is typically present in an amount of from about 0.01 to 15 wt %, for example in the range of from about 0.1 to 10 wt %. In particular embodiments, the modified colloidal silica is present in the final composition at a concentration in the range of from about 0.3 to 7 wt %. These amounts are based on insoluble silica, expressed as SiO2.

Adhesive Composition

The use of modified colloidal silica in the aqueous phase, and having it present during the polymerisation process, confers significant advantages not only on the synthesis, but also in the resulting product, in particular improved adhesive strength of both the dried adhesive and also of the adhesive after water treatment.

Typically, the adhesive formulation is in the form of an aqueous dispersion comprising optionally stabilised polymeric particles. The modified colloidal silica particles typically remain in the aqueous phase.

The amount of polymer in the final composition is typically in the range of from about 20 to 80 wt %, for example in the range of from about 30 to 70 wt %. In embodiments, the amount is in the range of from about 40 to 60 wt %, such as from about 45 to 55 wt %.

The adhesive compositions of the disclosure are able to improve dry and wet strength of the cured adhesive compared to silica-free compositions. They are also improved over unmodified silica-containing compositions, by having longer term shelf-life and storage stability.

Without being bound by theory, it is thought that functional groups on the colloidal silica, i.e. silanol groups on the silica surface directly, or functional groups (e.g. OH groups) on the organosilane moiety, can chemically interact (e.g. through covalent bonds, through hydrogen bonds or through ionic bonds) with the groups of the protective colloid on the surface of the polymer particles, thus providing additional sources of inter-polymer particle bonding, and increasing the overall strength of the dried or cured adhesive. This bonding will be present to at least a certain extent in the as-prepared adhesive composition, but will be present to a much greater extent in the dried (or cured) adhesive.

Although such bonding can exist when unmodified colloidal silica particles are used, use of unmodified silica results in a composition with poor long term stability, and hence low shelf-life. In modified silicas, whether modified by an additional element, or with an organosilane moiety, the number of surface silanol groups is reduced, which can help avoid silica agglomeration under the lower pH conditions typically present in the adhesive composition. It may also restrict the rate of reaction with protective colloid before use, thus helping to avoid too early curing or agglomeration of the dispersed polymer particles.

Further improvement in the adhesive composition properties can be achieved by including the modified colloidal silica in the polymer synthesis mixture, i.e. including it in the aqueous phase of the reaction mixture comprising emulsified/dispersed monomer-containing organic phase, as opposed to adding it as a post-polymerisation formulation additive. This is because post-addition with aqueous colloidal silica involves dilution of the polymer component in the final dispersion.

The median particle size (volume-based) of the polymer particles in the adhesive compositions is typically less than about 1.5 µm, for example less than about 1.0 µm. Typically, the median particle size is greater than about 0.05 µm, for example greater than about 0.2 µm.

The pH of the adhesive composition is typically in the range of from about 2 to 8, for example from about 2.5 to 6.

The viscosity of the adhesive composition at 20° C. is typically about 40000 mPas or less, such as about 25000 mPas or less or about 15000 mPas or less or, in further embodiments, about 10000 mPas or less. The viscosity is also typically no less than about 1000 mPas, for example no less than about 4000 mPas. Viscosity can be measured by routine methods, for example using ASTM D1084 or ASTM D2556.

EXAMPLES

The following non-limiting examples illustrate how to practice the disclosure.

The viscosity measurements were carried out on a Brookfield LV DV-I+ instrument. All measurements were performed using spindle LV64 using the rpm values (12 or 6 rpm) shown in Table 2, at 20° C.

The particle size measurements were made using a Malvern Mastersizer 2000 with a Hydro 2000S sampling unit. The particle refraction index was set to 1.467 and the absorption to 0. Dispersant refractive index was set to 1.33 (water). Stirring was set to 2900 rpm and ultrasound to 100% for the time shown in Table 2. After running a 15 second background, a total of 20 measurements per sample were performed.

The amounts of materials used in preparing the adhesive compositions were selected so as to ensure, as near as possible, the same solids (polymer) content, of ca 52 wt %.

In the organosilane-modified colloidal silicas referred to below, the method of modification described in WO2004/035473 or WO2004/035474 was used, employing sufficient organosilane to arrive at the degree of modification values indicated below. The organosilane compound used to modify the silicas was (3-glycidyloxypropyl)-triethoxysilane. In the modified sols, the epoxy group is hydrolysed to form a vicinal diol group.

The aluminium-modified colloidal silica used was commercially available Levasil™ CT37A (Akzo Nobel).

Colloidal Silica 1

This is a glycidoxypropyl silane-modified colloidal silica. The colloidal silica used to prepare the organomodified colloidal silica has a silica particle size of 7 nm, and a surface area prior to silane modification of 360 m$^2$ g$^{-1}$. The organosilane-modified product has a non-soluble silica content of 30 wt % (as $SiO_2$) and a pH of 7. The amount of silane added to the colloidal silica corresponds to a degree of modification (DM) value of 1.4 nm$^{-2}$.

Colloidal Silica 2

This is a glycidoxypropyl silane-modified colloidal silica. The colloidal silica used to prepare the organomodified colloidal silica has a silica particle size of 12 nm, and a surface area prior to silane modification of 220 m$^2$ g$^{-1}$. The organosilane-modified product has a non-soluble silica content of 40 wt % (as $SiO_2$) and a pH of 7. The amount of silane added to the colloidal silica corresponds to a DM value of 1.7 nm$^{-2}$.

Colloidal Silica 3

This is a glycidoxypropyl silane-modified colloidal silica. The colloidal silica used to prepare the organomodified colloidal silica has a silica particle size of 5 nm and a surface area prior to silane modification of 500 m$^2$ g$^{-1}$. The organosilane-modified product has a non-soluble silica content of 15 wt % (as $SiO_2$) and a pH of 10. The amount of silane added to the colloidal silica corresponds to a DM value of 2.0 nm$^{-2}$.

Colloidal Silica 4

This is a commercially available non-modified colloidal silica (Levasil™ CT36M). The particle size is 7 nm, and the non-soluble silica content is 30 wt % (as $SiO_2$). The pH is 10, and the colloidal silica has a surface-area of 360 m$^2$ g$^{-1}$.

Colloidal Silica 5

This is a commercially available aluminium-modified silica (Levasil™ CT36A) with a particle size of 7 nm. The non-soluble silica content is 30 wt % (as $SiO_2$), and the aluminium content is 0.4 wt % (as $Al_2O_3$). The pH is 10. The colloidal silica has a surface-area of 360 m$^2$ g$^{-1}$.

Colloidal Silica 6

This is a glycidoxypropyl silane-modified colloidal silica made from Colloidal Silica 4.

The organosilane-modified product has a non-soluble silica content of 30 wt % (as $SiO_2$) and a pH of 7. The amount of silane added to the colloidal silica corresponds to a DM of 1.05 nm$^{-2}$.

Adhesive Formulations

Polyvinyl acetate (PVAc) adhesive compositions were prepared according to the following procedure, using a Polyvinyl Alcohol (PVOH) having a molecular weight of 67000 g/mol and a degree of hydrolysis of 87-89%.

A mixture of 23.0 g PVOH, 1.1 g sodium bicarbonate, deionized water and (modified) colloidal silica was charged to a reactor and heated to 60° C. under a nitrogen atmosphere. The amount of deionized water and (modified) colloidal silica dispersion was adapted to ensure that the amount of PVOH was 3 wt %, and that the final adhesive composition comprised the amount of insoluble silica specified in Table 1 below. As an example, for an adhesive composition comprising Colloidal Silica 1, with a target final insoluble $SiO_2$ content (in the dry resin) of 1.7 wt %, then 292 g deionized water and 23.7 g of Colloidal Silica 1 were used. For a target insoluble $SiO_2$ content of 0.6 wt %, the amount used was 7.11 g Colloidal Silica 1 and 310 g deionized water was used. Before mixing with the organic phase, the solution was purged with nitrogen.

A portion of the vinyl acetate monomer (10% of the total weight of 380 g ultimately used) and a portion of a 1.6 wt % aqueous solution of potassium persulfate initiator (20% of the total weight of 75 g ultimately used) were then added under stirring, and the exotherm was recorded. After 15 minutes, the reaction temperature had increased by approximately 7° C., and the remainder of the vinyl acetate monomer and the initiator were then continuously added over a period of 3 hours. The reactor was maintained at ca 67° C. for an additional hour before being allowed to cool to room temperature. Small fluctuations in temperature were apparent due to the exothermic polymerisation reaction, and the maximum temperature typically reached was 68-72° C.

To measure particle sizes, a portion of the adhesive composition was subjected to ultrasound for 2 minutes. Particle sizes were approximately 600 nm.

Details of the final adhesive compositions are provided in Tables 1 and 2.

TABLE 1

Details of Adhesive Compositions

| Example | Colloidal Silica Sample | Insoluble $SiO_2$ (wt %) [2] | Measured Solid Content (wt %) |
|---|---|---|---|
| 1 [1] | — | 0 | 51.7 |
| 2 | 1 | 0.6 | 51.4 |
| 3 | 1 | 1.7 | 51.5 |
| 4 | 1 | 2.9 | 50.2 |
| 5 | 2 | 1.7 | 53.2 |
| 6 | 3 | 1.7 | 50.4 |
| 7 [1] | 4 | 1.7 | 51.1 |
| 8 [1] | 4 | 2.9 | 50.0 |
| 9 | 5 | 1.7 | 52.8 |
| 10 | 6 | 1.7 | 51.2 |

[1] Comparative example
[2] Insoluble silica content of dried adhesive

TABLE 2

Properties of Adhesive Compositions

| Example | Insoluble $SiO_2$ in dried resin wt % [2] | Viscosity (mPas) | D50 PVAc pH (μm) [3] | PSD span [4] |
|---|---|---|---|---|
| 1 [1] | 0 | 5950 | 4.0 0.56 | 1.35 |
| 2 | 0.6 | 8000 | — 0.65 | 1.11 |
| 3 | 1.7 | 8250 | 3.4 0.62 | 1.11 |
| 4 | 2.9 | 10250 | 4.0 0.44 | 1.13 |
| 5 | 1.7 | 9900 | 4.0 0.60 | 1.11 |
| 6 | 1.7 | 6300 | 4.1 0.47 | 1.10 |
| 7 [1] | 1.7 | 46800 [5] | 4.0 1.79 (1.64) | 2.14 (1.42) |
| 8 [1] | 2.9 | 96000 [5,6] | 4.1 1.63 (1.49) | 1.80 (1.28) |
| 9 | 1.7 | 6150 | 4.0 0.54 | 1.06 |
| 10 | 1.7 | 9800 | 4.0 0.7 | 1.10 |

[1] Comparative Example
[2] c.f. Table 1, column 3
[3] Volume-based median particle size after 2 minutes ultrasound treatment. Figures in brackets for examples 7 and 8 are after 4 minutes ultrasound.
[4] Volume-based particle size distribution span, i.e. after 2 minutes of ultrasound treatment. Figures in brackets for examples 7 and 8 are after 4 minutes ultrasound.
[5] Viscosity not stable over time, but increases on storage.
[6] at 6 rpm, as opposed to 12 rpm.

The measured content is based on gravimetric determination of solid contents. This was obtained by placing a small amount (typically 2.5 g) of PVAc dispersion in an aluminium foil cup, and heating in an oven at 130° C. for 2 h. The weight was recorded before and after drying. The solids content was calculated as weight of sample after drying/weight of wet dispersion.

From these results, using unmodified colloidal silica results in larger particle size properties of the polymer, implying poorer dispersion stability during the emulsion polymerisation process. This also manifests itself in a wider distribution/span of particle sizes, and increased viscosity of the uncured/undried material.

Conversely, using an organosilane-modified colloidal silica helps to maintain the properties of the polymeric dispersion, while also improving the adhesive properties once dried or cured.

The advantageous performance of the adhesive compositions was evaluated using an ABES (Automated Bonding Evaluation System from Adhesives Evaluation Systems, OR, USA) apparatus. A simplified principle of pressing and heating of finished bonds was used, as described in U.S. Pat. No. 8,465,581.

The composition was applied to the surfaces of two beech veneers of thickness 0.7 mm, width of 20 mm and length of 117 mm. The veneers were conditioned in 20° C. and 65% relative humidity (RH).

Adhesive was applied to one side of each veneer to provide a surface coverage of 200 g m-2. The glued area was 60 mm2 The same procedure was used for all adhesive systems. A pressure of 0.7 MPa was applied, and the pressing plates had a temperature of 80 or 110° C.

Figure 2:
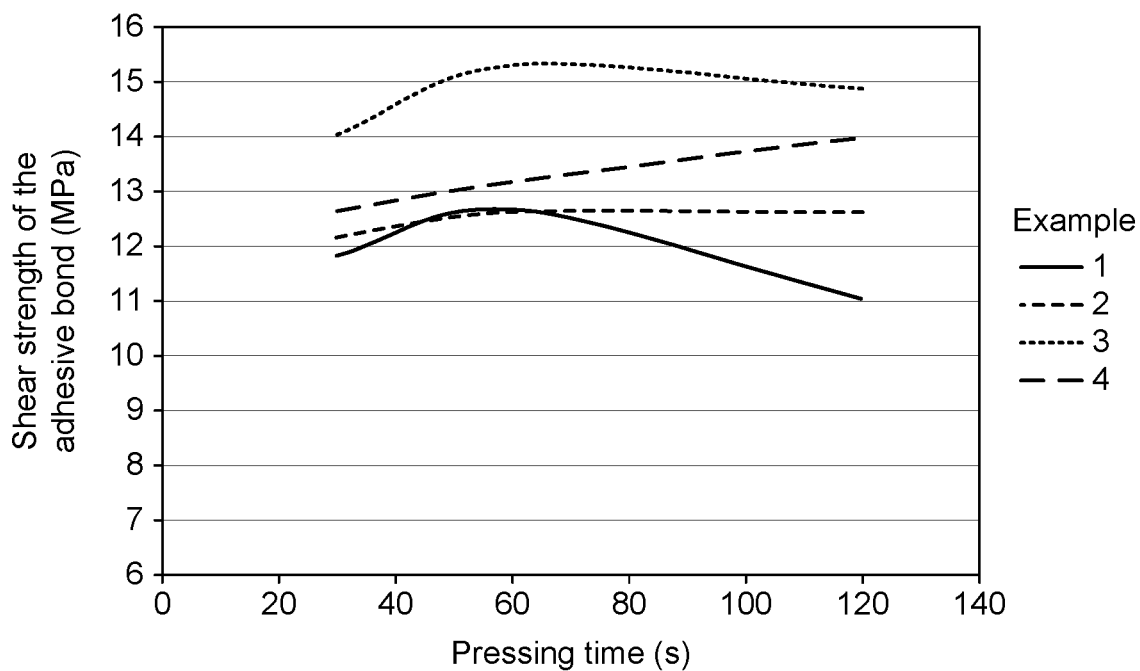
FIG. 2 is a plot of shear strength versus pressing time for dried adhesive compositions, where the surfaces were pressed together at a temperature of 120° C.
Figure 3:
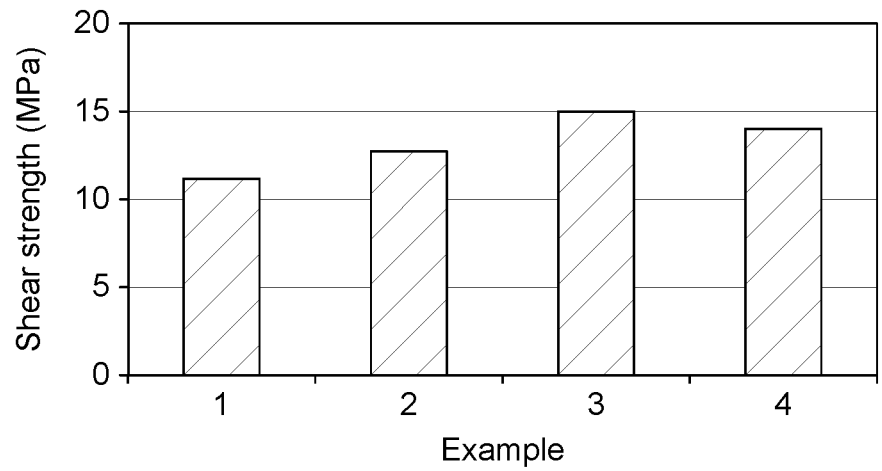
FIG. 3 is a bar chart comparing the shear strength of dried adhesive compositions, where the surfaces were pressed together at 110° C. for 120 s.

FIGS. 1 to 3 show the shear strengths after drying of the adhesive compositions of Examples 1 to 4 after pressing at 80° C. or 110° C. The samples were pressed for various periods of time, as follows:

At 80° C.: 30, 120, 300 and 480 s;

At 110° C.: 30, 60 and 120 s.

FIG. 1 shows results for samples dried at 80° C., and FIG. 2 for samples at 110° C. FIG. 3 shows results for the samples pressed at 110° C., and after 120 s pressing.

In these tests, 5 specimens for each adhesive type and for each pressing condition were tested. Determination of adhesive bond shear strength was conducted 30 s after cooling in the ABES apparatus.

FIGS. 1 to 3 demonstrate that the modified colloidal silica-containing compositions show improved adhesion strength at both curing temperatures.

Water durability tests were also conducted. Specimens were glued at two temperatures, with two pressing times at each temperature as follows:

At 80° C.: 300 and 480 s;
At 110° C.: 30 and 120 s.

In total, 13 specimens for each adhesive under each pressing condition were prepared (except for Examples 5, 6 and 7 conditioned at 110° C. and 120 s, which are described further below). Specimens were conditioned for 3 days at 20° C. and 65% RH before testing.

10 specimens (for each adhesive and for each condition) were immersed in water at room temperature (20° C.) for a duration of 3 h. The specimens were then removed from the water bath, and half the specimens were directly tested while still wet. The other half of the specimens were allowed to re-dry under ambient conditions until the initial mass (before immersion in the water bath) was reached, before being tested.

The other 3 specimens for each adhesive type and at each pressing condition were tested without any treatment as a dry strength reference.

For Examples 5, 6 and 7 pressed at 110° C. for 120 s, only 5 specimens were tested at each condition, and they were pre-conditioned for 1 week at 20° C. and 65% RH.

Figure 4:
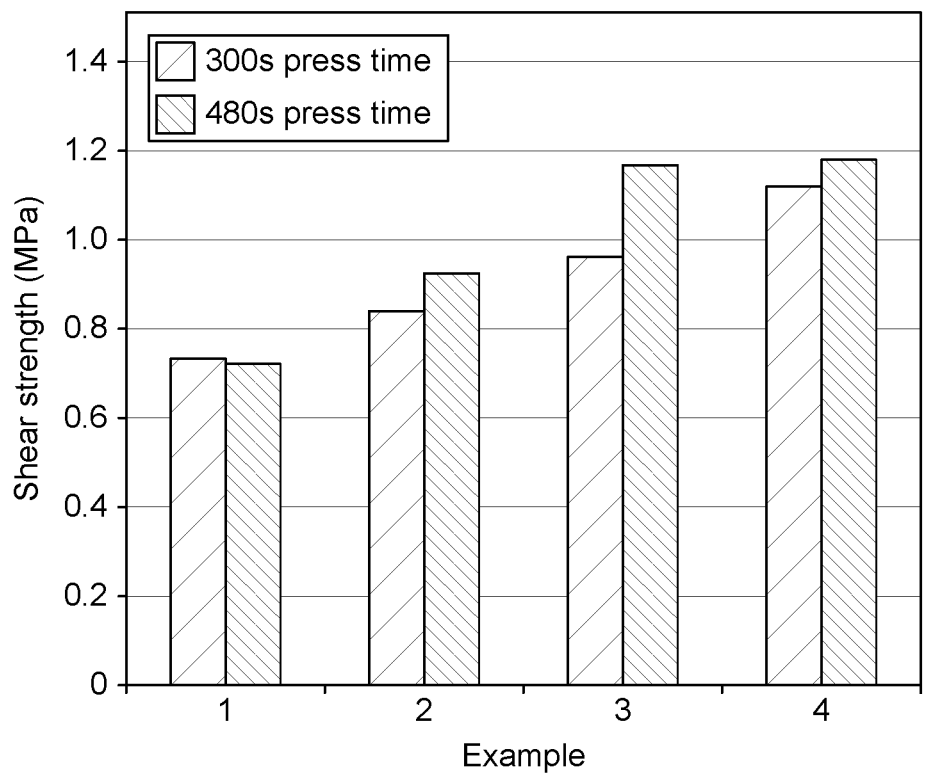
FIG. 4 is a bar chart comparing the shear strength of dried adhesive compositions after having been immersed in water, but before being allowed to re-dry. The surfaces were pressed together at 80° C. for 300 and 480 s.
Figure 5:
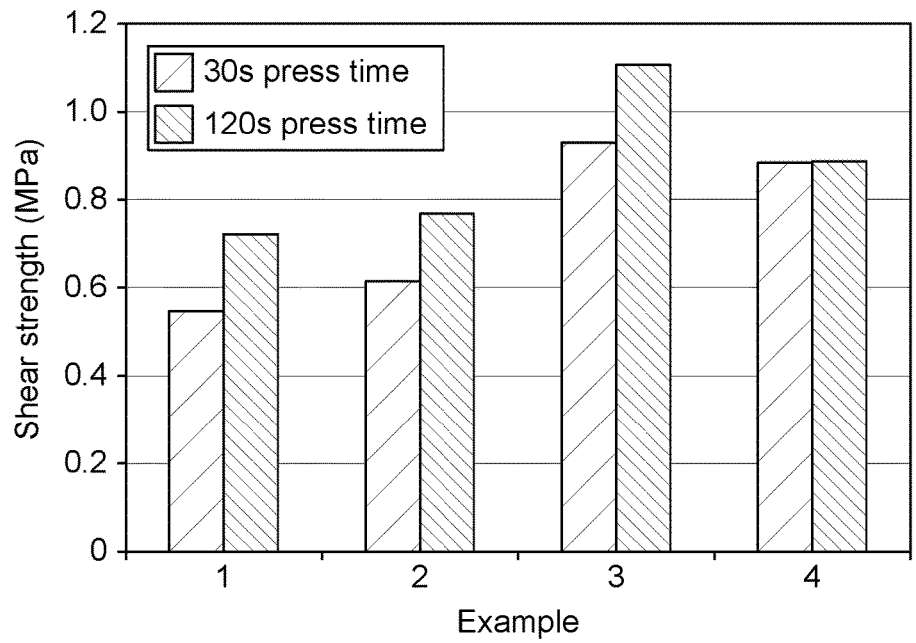
FIG. 5 is a bar chart comparing the shear strength of dried adhesive compositions after having been immersed in water, but before being allowed to re-dry. The surfaces were pressed together at 110° C. for 30 and 120 s.
Figure 6:
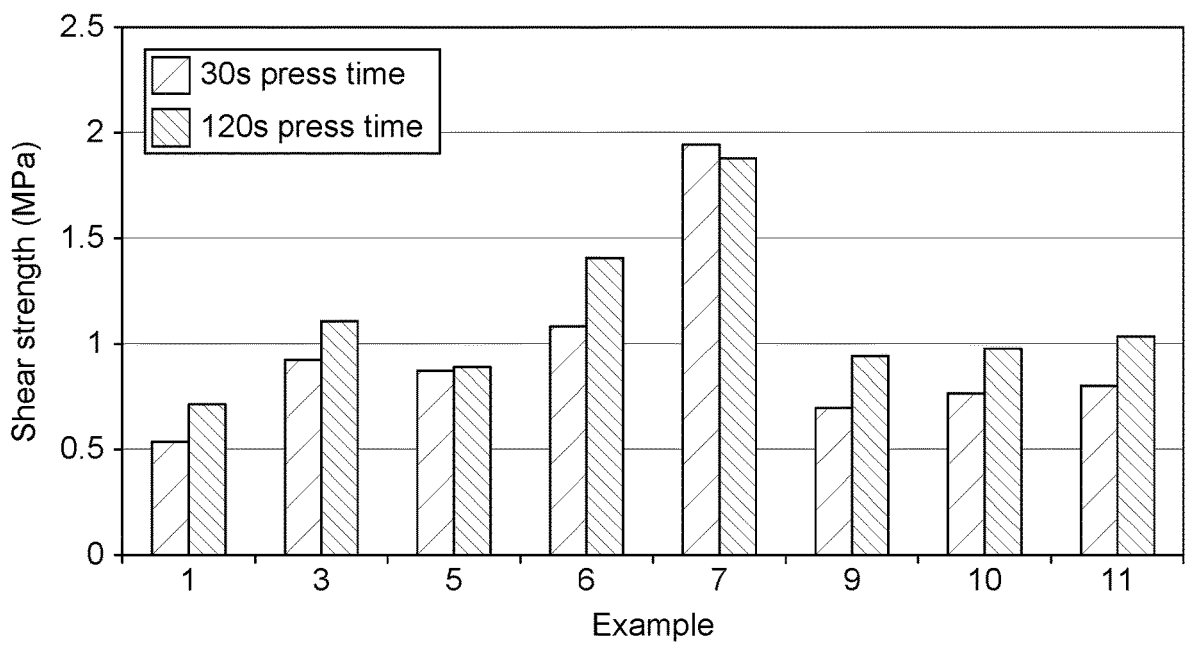
FIG. 6 is a bar chart corresponding to that of FIG. 5, but showing additional samples.

FIGS. 4 to 6 show wet strength of the dried/cured adhesive compositions after 3 h immersion in water, but before re-drying. FIG. 4 is for samples pressed at 80° C. and for 300 s or 480 s, and FIGS. 5 and 6 are for samples pressed at 110° C. for 30 s or 120 s.

FIG. 6 also includes results for a further comparative example, Example 11. This corresponds to Example 3, containing 1.7 wt % Colloidal Silica 1 in the dried resin, but was prepared by post-addition of 3 wt % Colloidal Silica 1 to the already polymerized dispersion, and not to the pre-polymerised monomer dispersion.

FIGS. 4 to 6 demonstrate the advantages of organosilane-modified colloidal silicas on wet-strength (c.f. Colloidal Silicas 1, 2, 3 and 6; Examples 2-6 and 10), compared to silica-free compositions (Example 1). Although the comparative unmodified silica (Colloidal Silica 4, Example 7) performed well in this test, results shown below demonstrate that the polymer dispersion is unstable with time, resulting in poor shelf-life.

These results also show that an aluminium-modified silica shows similar improved results (c.f. Colloidal Silica 5, Example 9), as does an organosilane-modified silica, but with lower organosilane loading (c.f. comparison between Example 10 and Example 3).

Comparison of Example 11 with Example 3 also highlights the advantages of adding the modified colloidal silica to the polymerization mixture, i.e. before polymerisation, as opposed to its subsequent addition as a formulation additive. The improved shear strength of Example 3 is at least in part due to a dilution effect in Example 11 of adding colloidal silica post-synthesis. Adding the colloidal silica to the aqueous phase before polymerization means that its water content can be taken into account by reducing the additional deionized water added to the aqueous phase. This is not possible after polymerization, unless concentration techniques are additionally applied, which adds complexity to the process, and also could have a detrimental effect on product quality.

Figure 7:
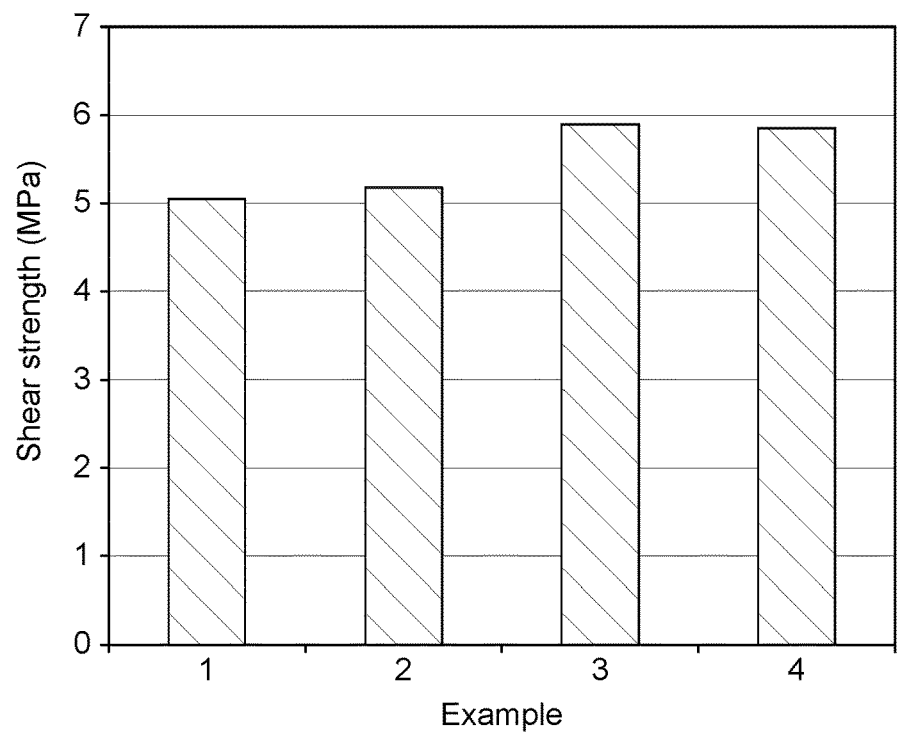
FIG. 7 is a bar chart comparing the shear strength of dried adhesive compositions, after immersion in water, and after re-drying. The surfaces were pressed together at 80° C. for 480 s.
Figure 8:
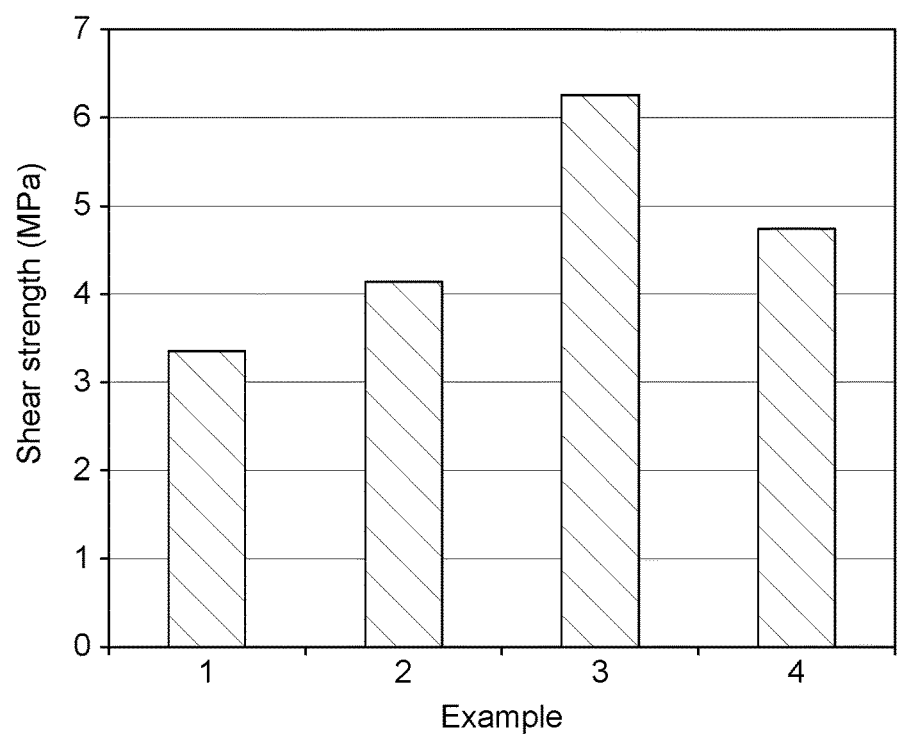
FIG. 8 is a bar chart comparing shear strength of dried adhesive compositions, after immersion in water, and after re-drying. The surfaces were pressed together at 110° C. for 120 s.
Figure 9:
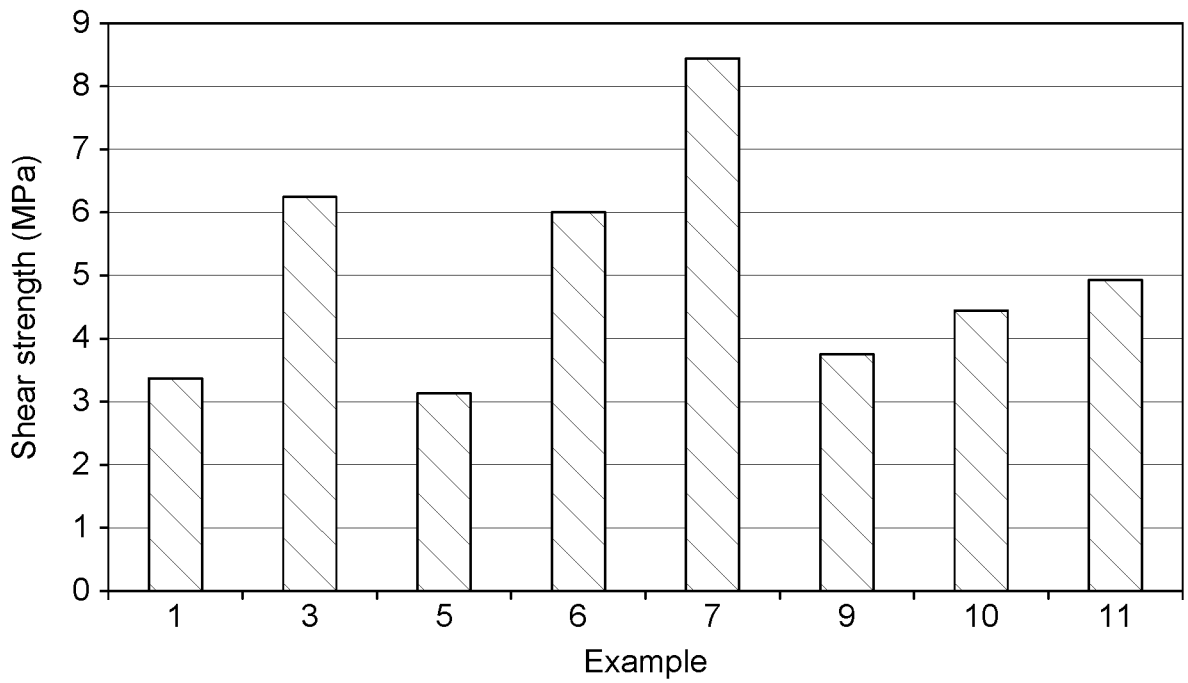
FIG. 9 is a bar chart corresponding to that of FIG. 8, but showing additional samples.

FIGS. 7 to 9 show wet-strength results after 3 h immersion, but after the samples are re-dried as described above. Results are shown for adhesive compositions pressed at 80° C. for 480 s (FIG. 7) or 110° C. and 120 s (FIGS. 8 and 9).

As with the other results, compositions containing the organosilane-modified silica (Colloidal Silicas 1-3 and 6; Examples 2-6 and 10) show improved strengths compared to the silica-free material (Example 1). The results also show the benefit on shear strength of unmodified silica (Colloidal Silica 4, Example 7) although, as already mentioned above, this example is unstable with time.

Figure 10:
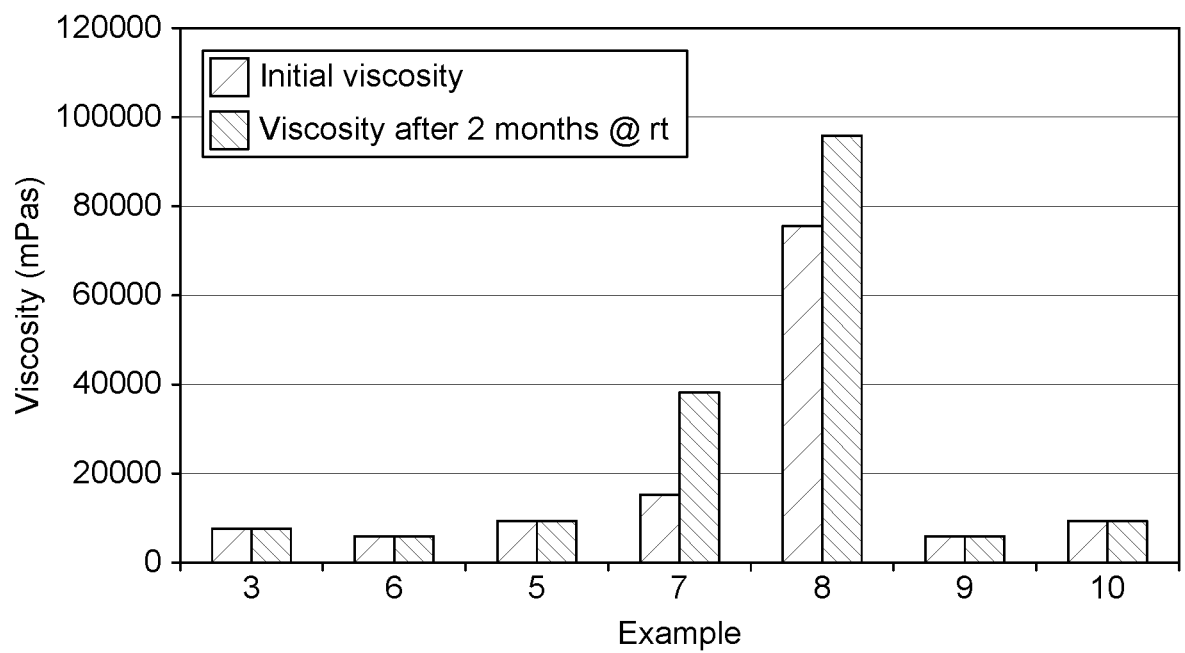
FIG. 10 is a bar chart comparing the viscosity of undried adhesive compositions both directly after preparation and after 2 months' storage in a sealed container at room temperature.

This is highlighted by FIG. 10, which shows storage stability of uncured adhesive formulations. The unmodified colloidal silica-containing compositions (Colloidal Silica 4, Examples 7 and 8) show not only high initial viscosity, but also a large viscosity increase over a 2 month period. The formulations containing the organosilane-modified and aluminium-modified silica show not only lower initial viscosity, but also almost no change in viscosity over the same time period.

These results demonstrate that adhesive compositions as contemplated herein, and prepared by a method as contemplated herein, show superior shear strength compared to reference samples, even after water treatment. They also show superior resistance to viscosity increase over time, leading to improved shelf-life.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A method for preparing an adhesive composition, in which an aqueous phase comprising a modified colloidal silica is contacted with an organic phase comprising one or more monomers in the presence of an initiator, wherein conditions are maintained such that polymerisation of the one or more monomers occurs to form a polymeric dispersion, wherein
   (i) the polymeric dispersion comprises polymer particles with protective colloid on their surface;
   (ii) the modified colloidal silica comprises colloidal silica particles with at least one surface-bound hydrophilic organosilane moiety and/or comprises colloidal silica particles with at least one additional element on their surface, the element being able formally to adopt a +3 or +4 oxidation state; and
   (iii) the initiator is at least partially soluble in water,
wherein at least one monomer is according to Formula 1;

Formula 1

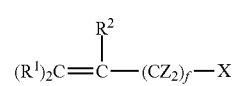

where:
$R^1$ and $R^2$ on each occurrence are independently selected from H, halide and $C_{1-20}$ alkyl, and where each $C_{1-20}$ alkyl can optionally be substituted with one or more groups selected from hydroxyl, halide, oxygen, $-OR^3$ and $-N(R^3)_2$ wherein the oxygen forms a C=O moiety;

$R^3$ on each occurrence is independently selected from H and optionally substituted $C_{1-6}$ alkyl, where the optional substituents are hydroxyl, halide, amino, $C_{1-6}$ alkoxy, $C_{1-6}$ alkyl-amino and $C_{1-6}$ dialkyl amino;

in the group $—(CZ_2)_f—$, each Z is independently selected from H, halide, $C_{1-3}$ alkyl and $C_{1-3}$ haloalkyl; and f is a whole number in the range of from 0 to 4;

X is selected from:
$—R^4$,

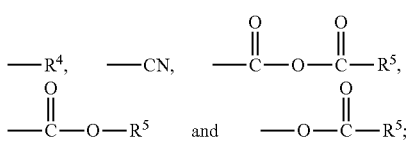

$R^4$ on each occurrence is independently selected from $C_{5-8}$ aryl and $C_{5-8}$ heteroaryl groups, optionally substituted with one or more groups selected from hydroxyl, halide, $—N(R^3)_2$, nitrile, $C_{1-10}$ alkyl, $C_{1-10}$ haloalkyl, $C_{1-10}$ alkoxy and $C_{1-10}$ haloalkoxy, wherein the heteroaryl group comprises one or more heteroatoms in the ring, each independently selected from O, S and N; and $R^5$ on each occurrence is independently selected from H, optionally substituted $C_{1-20}$ alkyl and optionally substituted $C_{1-20}$ alkenyl, the optional substituents being selected from one or more of hydroxyl, halide and $—N(R^3)_2$.

2. The method of claim 1, in which one or more of the following conditions apply:
(i) f is zero;
(ii) each $R^1$ and $R^2$ are selected from H and unsubstituted $C_{1-2}$ alkyl;
(iii) $R^5$ is optionally substituted $C_{1-12}$ alkyl, with no halide substituents.

3. The method of claim 1, in which there is one or more co-monomers, and wherein one or more of the following conditions apply:
(i) at least one co-monomer is of Formula I and
(ii) at least one co-monomer is a halide-substituted $C_{1-8}$ mono-olefine.

4. The method of claim 1, in which the protective colloid is a saponified or partially saponified polyvinyl alcohol, and has a degree of hydrolysis in the range of from about 70 to about 100 mol %.

5. The method of claim 1, in which the hydrophilic organosilane moiety comprises at least one group selected from the group consisting of hydroxyl, thiol, carboxyl, ester, epoxy, acryloxy, ketone, aldehyde, (meth)acryloxy and amino.

6. The method of claim 1, in which the hydrophilic organosilane moiety comprises one or more hydrophilic groups $R^m$ directly bound to the silicon atom of the silane, where:
each $R^m$ is independently selected from the group consisting of alkyl, alkenyl, epoxy alkyl, aryl, heteroaryl, $C_{1-6}$ alkylaryl and $C_{1-6}$ alkylheteroaryl groups, optionally substituted with one or more groups selected from ERA, isocyanate and isocyanurate;
E is either not present, or is a linking group selected from $–O–$, $—S—$, $OC(O)—$, $C(O)—$, $—C(O)O—$, $—C(O)OC(O)—$, $—N(R^p)—$, $—N(R^p)C(O)—$, $—N(R^p)C(O)N(R^p)—$ and $—C(O)N(R^p)—$, where $R^p$ is H or $C_{1-6}$ alkyl;

$R_n$ is linked to E, or directly to $R^m$ if E is not present;
$R^n$ is selected from the group consisting of halogen, alkyl, alkenyl, aryl, heteroaryl, $C_{1-3}$ alkylaryl and $C_{1-3}$ alkylheteroaryl, and each RA is optionally substituted with one or more groups selected from the group consisting of hydroxyl, halogen, epoxy, $—OR^p$ or $—N(R^p)_2$; and
if E is present, $R^n$ can also be hydrogen.

7. The method of claim 1, in which the organosilane moiety comprises an epoxy group or at least one hydroxyl group.

8. The method of claim 1, in which the additional element is selected from the group consisting of Ge, Sn, B, Al, Ga, In, Cr, Mn, Fe, Co, Zr and Ce.

9. The method of claim 1, in which the initiator is one or more compounds at least partially soluble in water, selected from the group consisting of inorganic peroxides, organic peroxides, peroxydicarbonates and azo compounds.

10. The method of claim 1, in which one or more of the following conditions apply:
(i) the silica content of the adhesive composition is in the range of from about 0.01 to about 15 wt %;
(ii) the amount of polymer in the adhesive composition is in the range of from about 20 to about 80 wt %;
(iii) the volume-based median particle size of the polymer particles in the adhesive composition is less than about 1.5 μm; and
(iv) the viscosity at about 20° C. of the adhesive composition is in the range of from about 1000 to about 40000 mPas.

11. The method of claim 1, in which one or more of the following conditions apply:
(i) the silica content of the adhesive composition is from about 0.01 to about 15 wt %;
(ii) the amount of polymer in the adhesive composition is from about 20 to about 80 wt %;
(iii) the volume-based median particle size of the polymer particles in the adhesive composition is less than about 1.5 μm; and
(iv) the viscosity at about 20° C. of the adhesive composition is from about 1000 to about 40000 mPas.

12. The method of claim 5, in which one or more of the following conditions apply:
(i) the silica content of the adhesive composition is from about 0.01 to about 15 wt %;
(ii) the amount of polymer in the adhesive composition is from about 20 to about 80 wt %;
(iii) the volume-based median particle size of the polymer particles in the adhesive composition is less than about 1.5 μm; and
(iv) the viscosity at about 20° C. of the adhesive composition is from about 1000 to about 40000 mPas.

13. The method of claim 1 wherein each of $R^1$ and $R^2$ is H, f is 0, X is O—C(O)—$R^5$ and $R^5$ is methyl.

14. The method of claim 3 wherein each of $R^1$ and $R^2$ is H, f is 0, X is O—C(O)—$R^5$ and $R^5$ is methyl.

15. The method of claim 4 wherein each of $R^1$ and $R^2$ is H, f is 0, X is O—C(O)—$R^5$ and $R^5$ is methyl.

16. The method of claim 5 wherein each of $R^1$ and $R^2$ is H, f is 0, X is O—C(O)—$R^5$ and $R^5$ is methyl.

17. The method of claim 6 wherein each of $R^1$ and $R^2$ is H, f is 0, X is O—C(O)—$R^5$ and $R^5$ is methyl.

18. The method of claim 7 wherein each of $R^1$ and $R^2$ is H, f is 0, X is O—C(O)—$R^5$ and $R^5$ is methyl.

19. The method of claim 8 wherein each of $R^1$ and $R^2$ is H, f is 0, X is O—C(O)—$R^5$ and $R^5$ is methyl.

* * * * *